(12) United States Patent
Prieto et al.

(10) Patent No.: US 11,730,174 B2
(45) Date of Patent: Aug. 22, 2023

(54) SYSTEM FOR CONVEYING AND DISPENSING HEATED FOOD MATERIAL

(71) Applicant: NORDSON CORPORATION, Westlake, OH (US)

(72) Inventors: Vincent A. Prieto, Lorain, OH (US); James V. Bachman, Lorain, OH (US); Jared J. Bell, Lakewood, OH (US); Joseph C. Waryu, Amherst, OH (US); Marco Ciccone, North Royalton, OH (US); Jennifer Lynn Volcansek, Grafton, OH (US); Mark W. Novotny, Avon Lake, OH (US); Madeline Blyth Oswalt, Westlake, OH (US); Ben Price, Elyria, OH (US); Daniel J. Brodsky, Westlake, OH (US); Kenneth Watson, Elyria, OH (US); Deborah Kosovich, Grafton, OH (US); Timothy E. Wilson, Huron, OH (US); Robert Zuccarelli, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 31 days.

(21) Appl. No.: 15/742,025

(22) PCT Filed: Jul. 8, 2016

(86) PCT No.: PCT/US2016/041539
§ 371 (c)(1),
(2) Date: Jan. 4, 2018

(87) PCT Pub. No.: WO2017/008027
PCT Pub. Date: Jan. 12, 2017

(65) Prior Publication Data
US 2019/0082712 A1 Mar. 21, 2019

Related U.S. Application Data

(60) Provisional application No. 62/190,482, filed on Jul. 9, 2015.

(51) Int. Cl.
*A23G 1/18* (2006.01)
*A23G 1/20* (2006.01)
(Continued)

(52) U.S. Cl.
CPC ............... *A23G 1/18* (2013.01); *A23G 1/206* (2013.01); *A23G 3/0226* (2013.01);
(Continued)

(58) Field of Classification Search
None
See application file for complete search history.

(56) References Cited

U.S. PATENT DOCUMENTS 3,021,779 A 2/1962 Robert
3,792,801 A 2/1974 Baker et al.
(Continued)

FOREIGN PATENT DOCUMENTS

EP 0 554 707 A1 8/1993
JP 58-170438 A 10/1983
(Continued)

OTHER PUBLICATIONS

International Patent Application No. PCT/US2016/041539; Int'l Preliminary Report on Patentability; dated Jan. 18, 2018; 10 pages.

*Primary Examiner* — Charles Capozzi
(74) *Attorney, Agent, or Firm* — BakerHostetler

(57) ABSTRACT

System for conveying and dispensing material may include a heated supply of the material, one or more heated hoses, a heated dispenser, and a pump having a heating device internal the pump. A pump for conveying liquid or liquefied material, for example chocolate, may include one or more
(Continued)

heating devices disposed within the pump. A filter may also be provided with an optional internal heating device.

14 Claims, 19 Drawing Sheets

(51) Int. Cl.
| | |
|---|---|
| A23G 3/02 | (2006.01) |
| A23G 3/20 | (2006.01) |
| B05B 12/10 | (2006.01) |
| B05B 9/04 | (2006.01) |
| B05B 12/12 | (2006.01) |
| B05B 13/04 | (2006.01) |
| F04B 9/12 | (2006.01) |
| F04B 15/02 | (2006.01) |
| F04B 53/12 | (2006.01) |
| F04B 53/14 | (2006.01) |
| F04B 53/20 | (2006.01) |
| B05B 15/58 | (2018.01) |
| F04B 9/00 | (2006.01) |

(52) U.S. Cl.
CPC ........... *A23G 3/0257* (2013.01); *A23G 3/203* (2013.01); *A23G 3/2092* (2013.01); *B05B 9/0409* (2013.01); *B05B 9/0423* (2013.01); *B05B 12/10* (2013.01); *B05B 12/122* (2013.01); *B05B 13/0457* (2013.01); *B05B 15/58* (2018.02); *F04B 9/00* (2013.01); *F04B 9/12* (2013.01); *F04B 15/02* (2013.01); *F04B 53/126* (2013.01); *F04B 53/144* (2013.01); *F04B 53/20* (2013.01); *F04B 2205/11* (2013.01)

(56) References Cited

U.S. PATENT DOCUMENTS

| | | | | |
|---|---|---|---|---|
| 4,842,162 A | | 6/1989 | Merkel | |
| 4,897,236 A | * | 1/1990 | Rabiger | B29B 7/486 366/85 |
| 4,922,852 A | | 5/1990 | Price | |
| 5,017,390 A | * | 5/1991 | Sawant | A23G 9/48 426/279 |
| 5,049,340 A | * | 9/1991 | Moss | B29D 7/01 264/216 |
| 5,480,664 A | * | 1/1996 | Ferrero | A21C 9/04 118/13 |
| 5,664,485 A | * | 9/1997 | McDilda | A21C 9/06 118/13 |
| 5,750,186 A | * | 5/1998 | Frazzitta | B41M 7/0054 427/8 |
| 6,216,528 B1 | * | 4/2001 | Carrell | F02M 57/025 73/54.01 |
| 2004/0110394 A1 | * | 6/2004 | Barth | H01L 21/02205 438/782 |
| 2004/0154532 A1 | * | 8/2004 | Ramsay | B05B 9/0403 118/300 |
| 2012/0251688 A1 | * | 10/2012 | Zimmerman | A23G 1/206 426/383 |
| 2013/0084370 A1 | * | 4/2013 | Zacharias | A23L 3/003 99/334 |
| 2014/0005957 A1 | * | 1/2014 | Pihlaja | G01N 11/08 702/50 |
| 2014/0138400 A1 | * | 5/2014 | Donner | B05C 11/1013 222/1 |
| 2014/0367481 A1 | * | 12/2014 | Toh | B05B 1/24 239/11 |
| 2015/0190840 A1 | * | 7/2015 | Muto | B05C 19/06 427/8 |

FOREIGN PATENT DOCUMENTS

| | | |
|---|---|---|
| JP | 63-049044 A | 3/1988 |
| WO | 2009/063010 A2 | 5/2009 |
| WO | 2014/004166 A1 | 1/2014 |

* cited by examiner

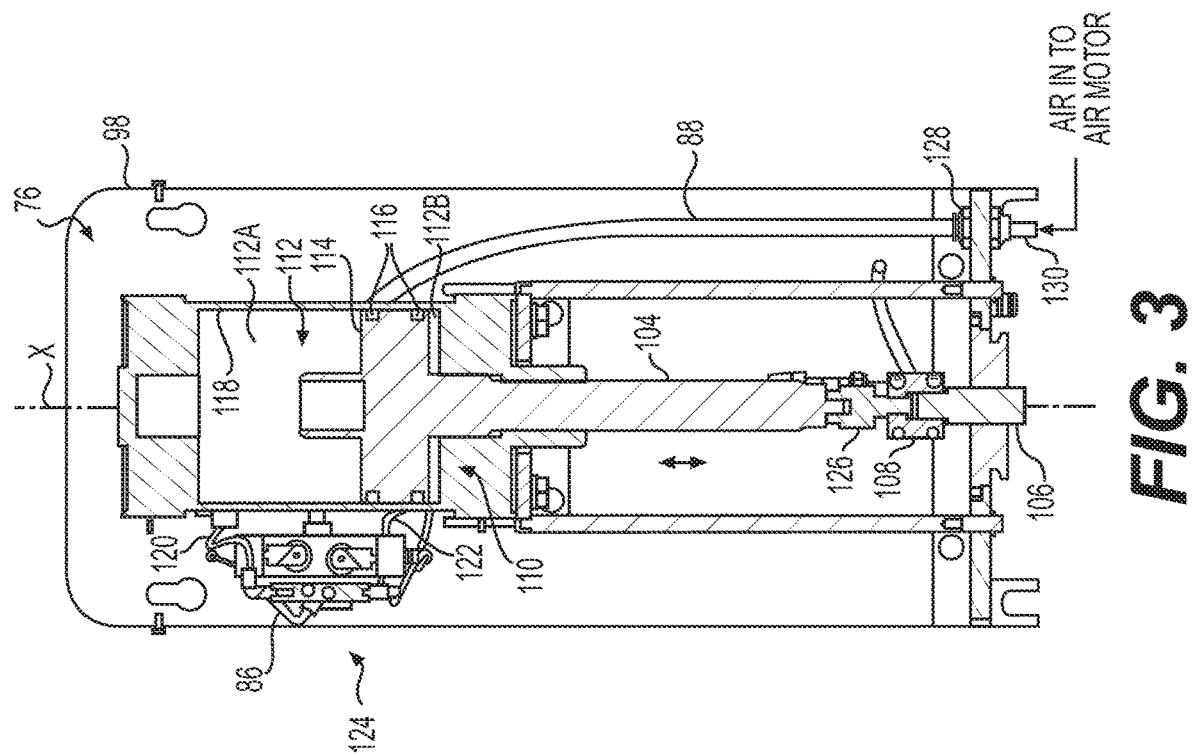
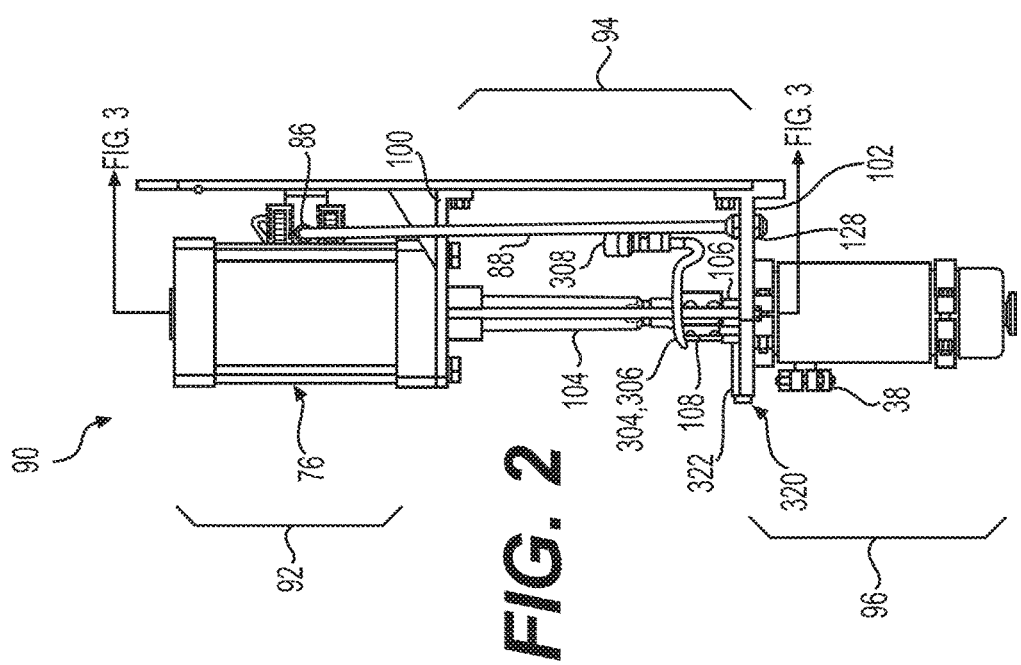

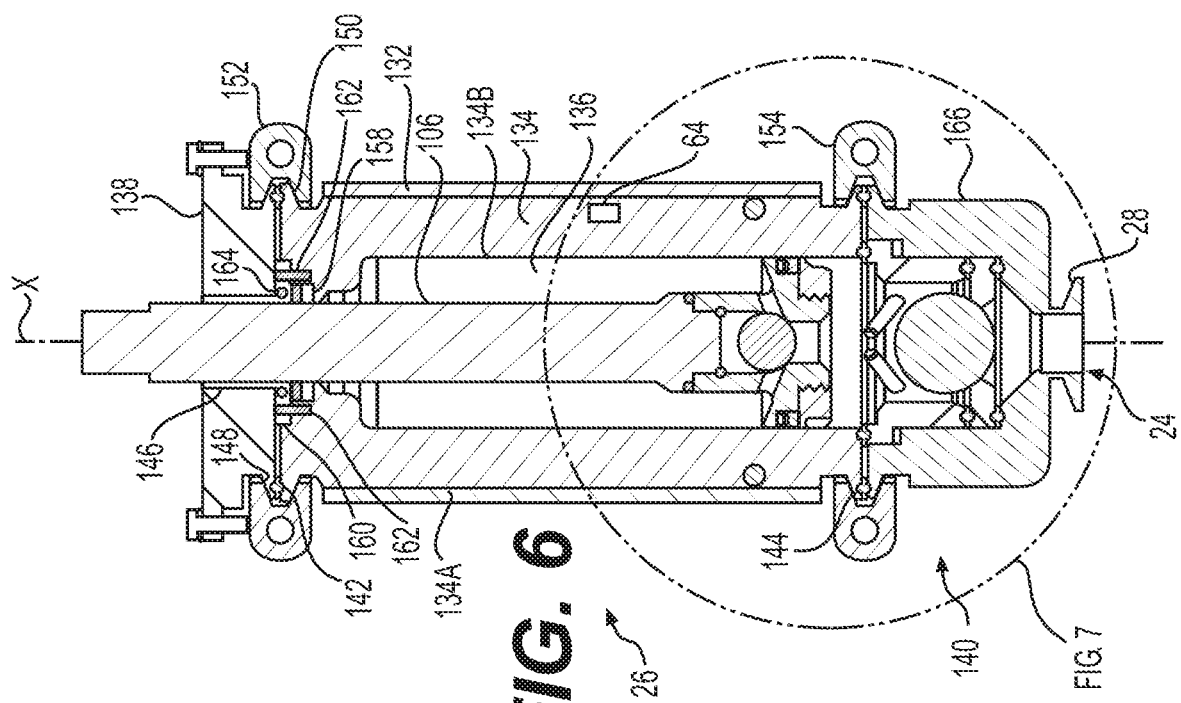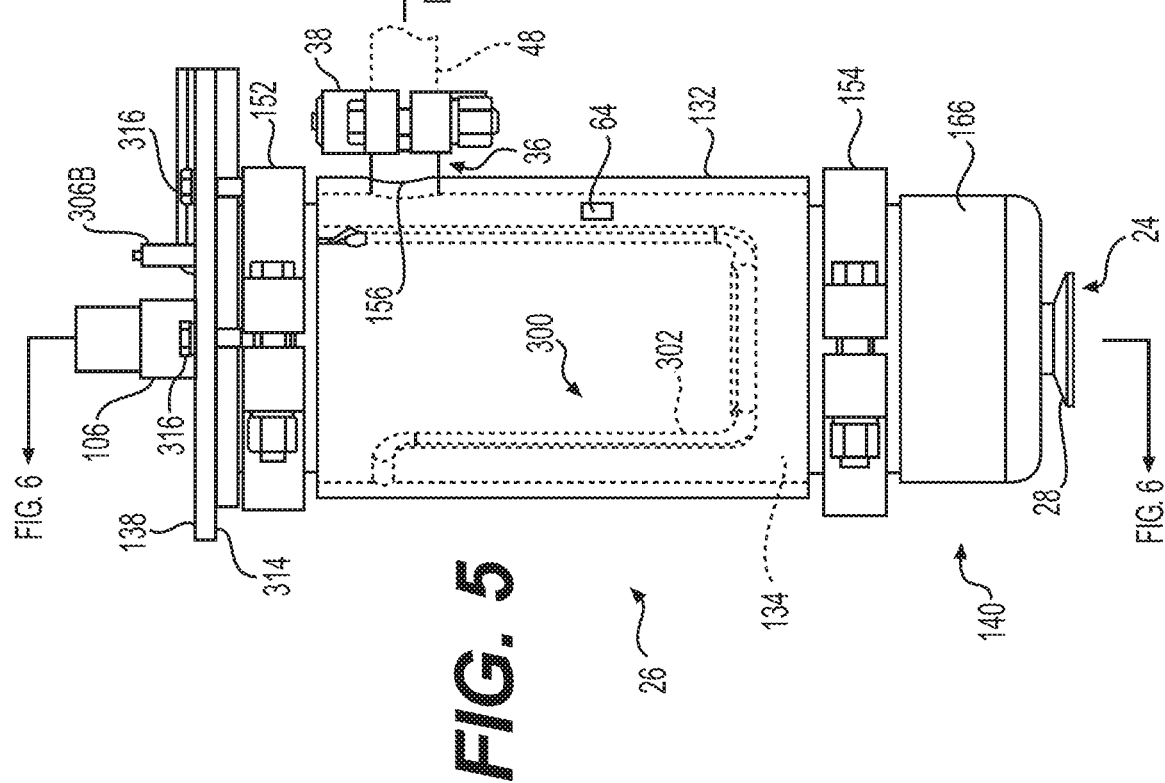

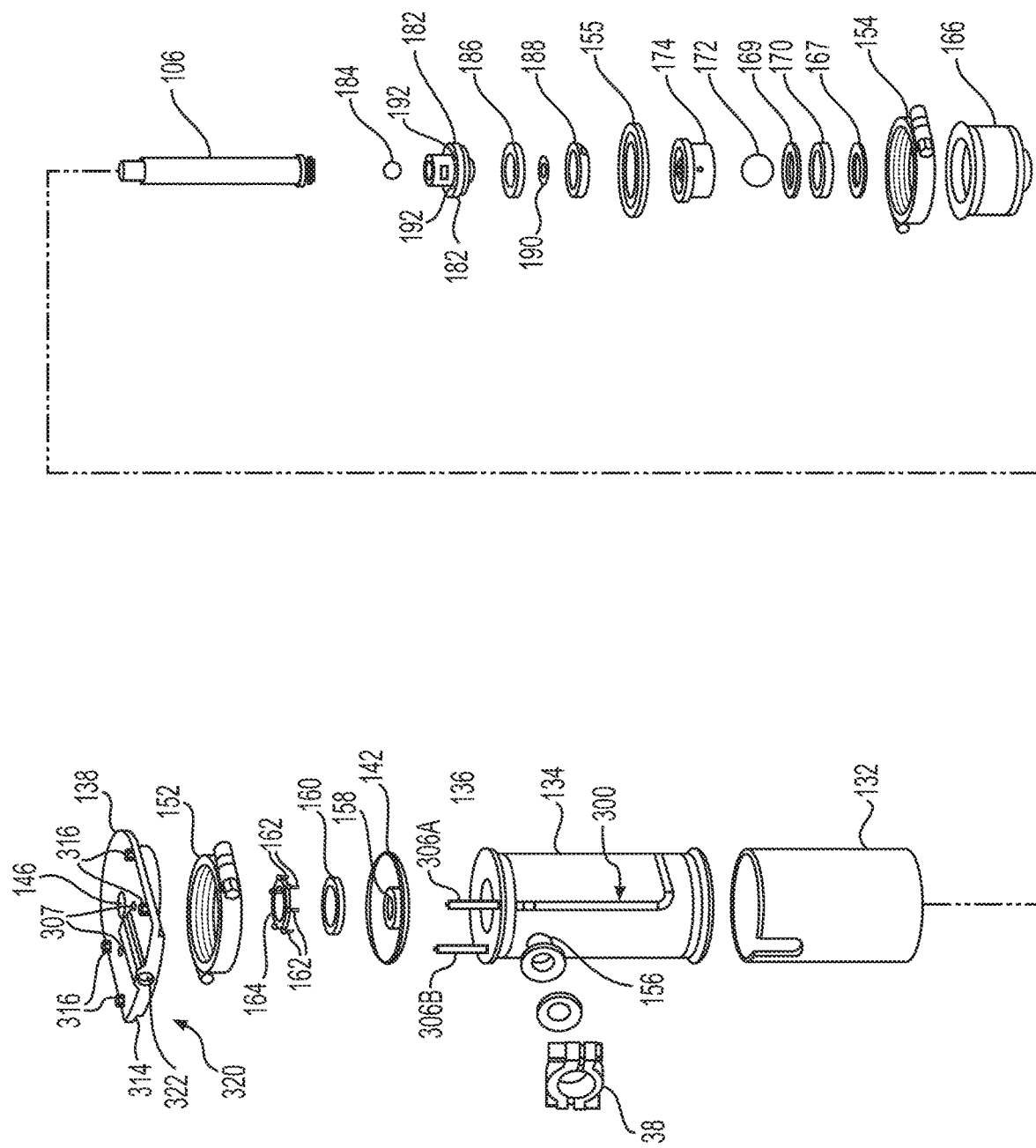

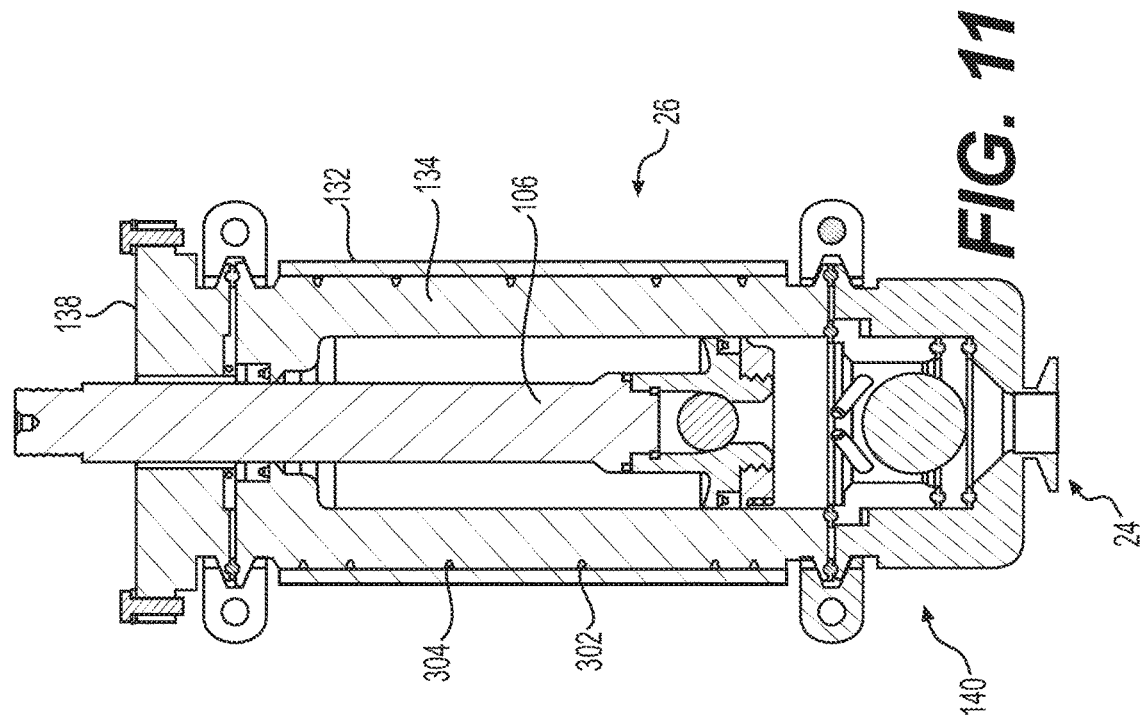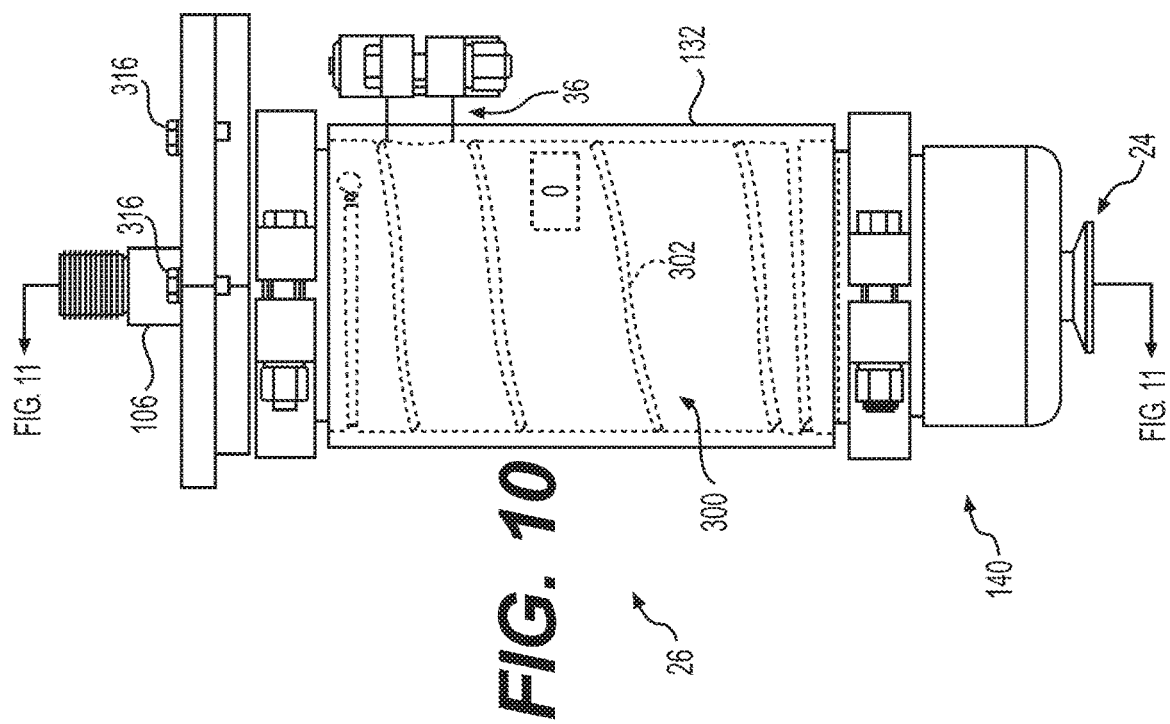

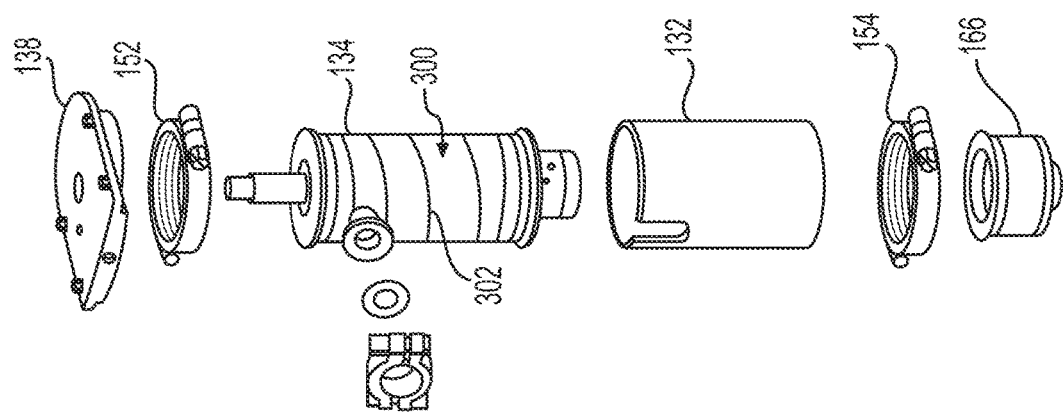

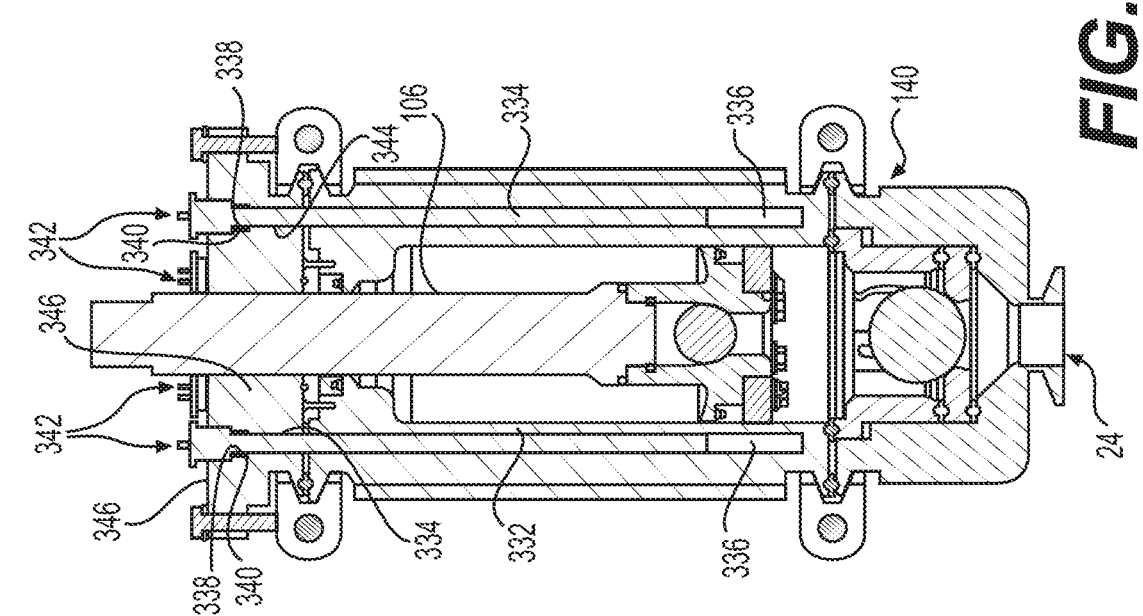
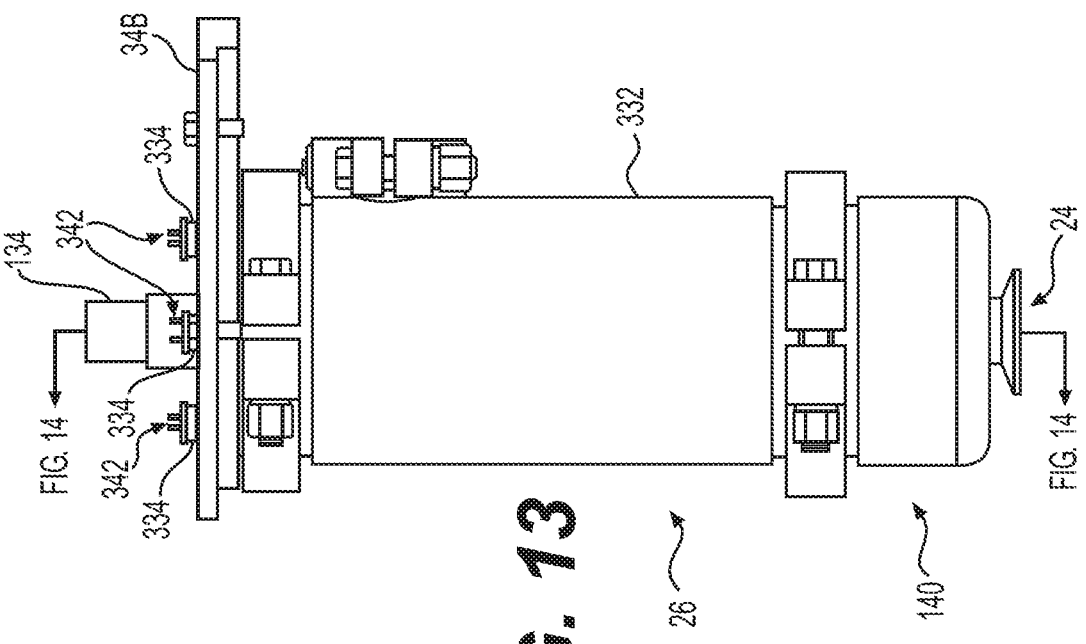

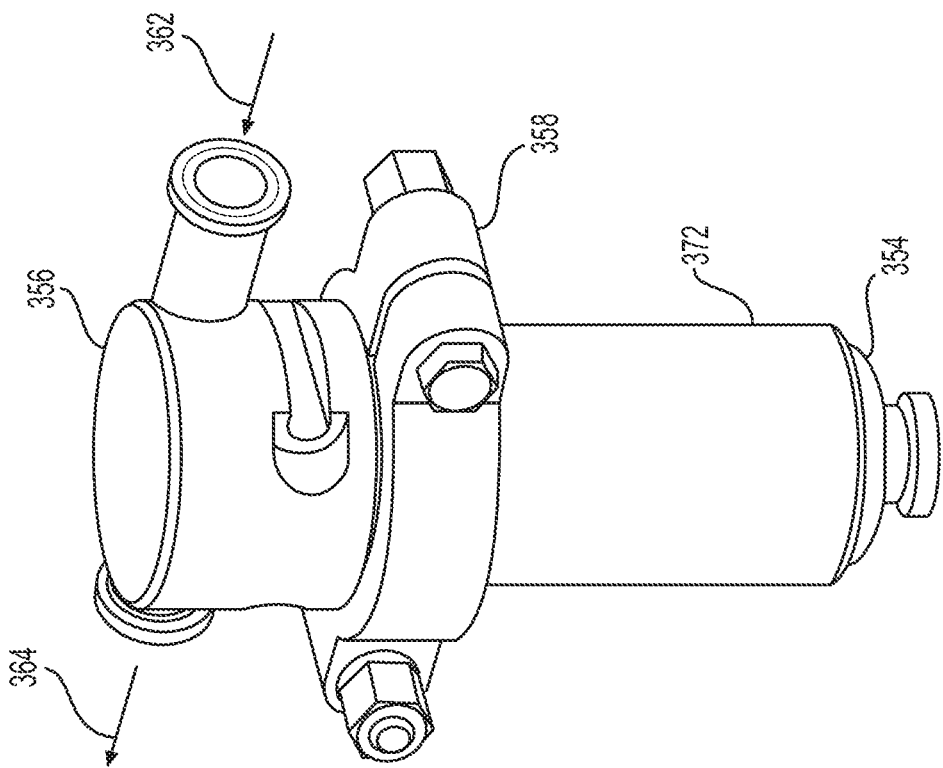

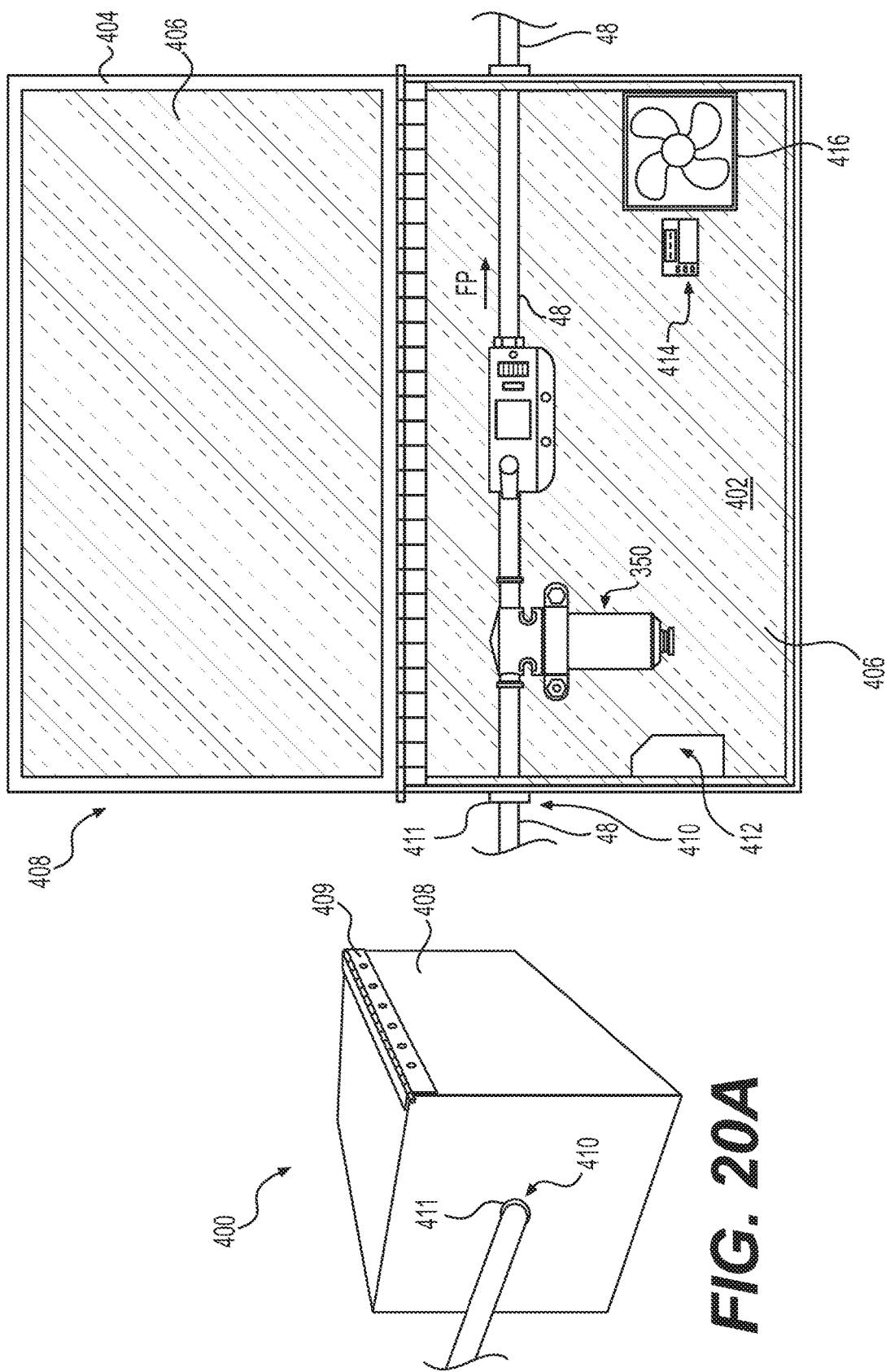

SYSTEM FOR CONVEYING AND DISPENSING HEATED FOOD MATERIAL

CROSS-REFERENCE TO RELATED APPLICATIONS

This application is a U.S. National Stage of International Patent App. No. PCT/US2016/041539, filed Jul. 8, 2016, and published as International Patent Pub. No. WO 2017/008027 A1 on Jan. 12, 2017, which claims the benefit of U.S. Provisional Patent Application No. 62/190,482, filed Jul. 9, 2015, both of which are incorporated herein by reference in their entirety.

TECHNICAL FIELD

The present disclosure relates generally to a system for conveying and dispensing materials, and more particularly, to a system for conveying and dispensing heated food materials at a reduced viscosity.

BACKGROUND

Food processing systems are often equipped with pumps configured to pressurize fluid material out of dispensers to coat a substrate. Difficulties arise when the dispensed material (e.g., chocolate) is highly viscous or solid at room temperature. For example, current systems often have difficulty in maintaining the material in a fluid state during the entire pumping and dispensing process, such that the material often solidifies and clogs the systems. However, if excessive heat is applied, the material may become charred and not suitable for application. Therefore, there is a need to maintain the material to be dispensed at a desired temperature during the entire pumping and dispensing process.

SUMMARY

Subheadings are provided in the summary below to help guide through some of the various embodiments described in this application.

System for Conveying and Dispensing Heated Materials

A first embodiment is directed to a system for applying a material onto a surface of a substrate. The system may include a supply configured to contain the material, and the supply may comprise a supply heating device configured to provide heat to the material. The system may include a pump comprising a pump inlet, a pump outlet, and a pump heating device. The pump inlet may be fluidly coupled to the supply, the pump heating device may be configured to provide heat to the material, and the pump may be configured to pressurize and discharge the material through the pump outlet. The system may also include at least one dispenser fluidly coupled to the pump outlet, wherein the at least one dispenser is configured to apply the material onto the surface.

The system may further include one or more of the following features: the pump heating device may include a resistive heating device positioned inside of the pump: the pump may include a cylinder configured to provide a flow path for the material between the pump inlet and the pump outlet, and the resistive heating device may be positioned externally of the flow path and configured to apply the heat to the material by heat transfer through the cylinder; the dispenser may include a dispenser heating device configured to provide heat to the material and a temperature sensor configured to detect a temperature of the material; the heat applied by the supply heating device and the pump heating device may be configured to reduce the viscosity of the material: the material may include at least one of chocolate, oil, icing, and butter; at least one temperature sensor configured to detect a temperature of the material and generate a signal, and a control circuit in communication with the at least one temperature sensor, the supply heating device, and the pump heating device, wherein the control circuit is configured to receive the signal and adjust the supply heating device and/or the pump heating device to maintain the material within a predetermined temperature range; a supply conduit configured to provide a flow path for the material between the supply and the pump, the supply conduit may include a supply conduit heating device, and at least one feed conduit configured to provide a flow path for the material between the pump and the dispenser, the at least one feed conduit including a feed conduit heating device; at least one flow sensor configured to detect a flow rate of the material through at least one of the supply conduits and the at least one feed conduit, and generate a signal, and a control circuit in communication with the at least one flow sensor, the supply conduit heating device, and the feed conduit heating device, the control circuit may be configured to compare the signal to a reference signal indicative of a predetermined temperature and adjust at least one of the supply conduit heating device and the feed conduit heating device based on the detected flow rate being lower than the predetermined flow rate; the at least one dispenser may include a first dispenser oriented at a first angle to apply the material onto a front surface of the substrate, and a second dispenser oriented at a second angle to apply the material on a rear surface of the substrate; the first dispenser and the second dispenser may be symmetrically oriented; the at least one dispenser may include a flat fan pattern spray nozzle.

Temperature Containment System

A second embodiment is directed to a system for dispensing a material onto a surface of a substrate. The system may include a pump comprising a pump inlet and a pump outlet, wherein the pump may be configured to pressurize and discharge the material from the pump inlet and out through the pump outlet. The system may also include at least one dispenser fluidly coupled to the pump outlet and configured to apply the material onto the surface, a fluid flow path in fluid communication with the pump and the at least one dispenser, and an insulated container configured to enclose at least a portion of the fluid flow path.

The system may further include one or more of the following features: the insulated container may include a box including a rigid material lined with a layer of insulating material; the rigid material may be metal; the insulated container may include a hinged door configured to provide access to an interior of the insulated container; the insulated container may also include at least one opening through a surface of the insulated container, wherein the at least one opening may be configured to enable the fluid flow path from an interior of the insulated container to an exterior of the insulated container; a heating device may be enclosed by the insulated container, the heating device may be configured to apply heat to an interior of the insulated container, and a temperature sensor may be enclosed by the insulated container, the temperature sensor may be configured to detect the temperature of the interior of the insulated container; the heating device of the insulated container may include a forced convection heater; the heating device may be configured to maintain an interior of the insulated container at a temperature between about 100° F. and 180° F.; a fan may be enclosed by the insulated container, the fan may be configured to increase air circulation of the interior of the insulated container; the insulated container may not enclose at least one of the pump and the at least one dispenser; a filter may be in fluid communication with the fluid flow path, wherein the filter may be enclosed within the insulated container; a second insulated container may be configured to enclose a second portion of the fluid flow path, the portion of the fluid flow path enclosed by the insulated container may be upstream of the at least one dispenser; and the second portion of the fluid flow path enclosed by the second insulated container may be downstream of the at least one dispenser; a supply may be configured to contain the material, the supply may include a supply heating device configured to provide heat to the material, and the pump includes a pump heating device configured to provide heat to the material.

Angular Spray System

A third embodiment is directed to a system for dispensing a material onto a substrate conveyed by a conveyor along a conveyance axis. The system may include a first dispenser configured to apply the material onto a front surface of the substrate, the first dispenser being oriented at a first compound angle defined by a first vertical angle and a first lateral angle, each relative to the conveyance axis, and a second dispenser configured to apply the material onto a rear surface of the substrate, the second dispenser being oriented at a second compound angle defined by a second vertical angle and a second lateral angle, each relative to the conveyance axis.

The system may further include one or more of the following features: the first dispenser may be configured to apply the material onto the first surface, a top surface, and a first side surface of the substrate, and the second dispenser may be configured to apply the material onto the rear surface, the top surface, and a second side surface of the substrate; the first vertical angle may have the same magnitude as the second vertical angle; the first lateral angle may have the same magnitude as the second lateral angle; each of the first vertical angle, the second vertical angle, the first lateral angle, and the second lateral angle may be between about 15 degrees and 60 degrees; the first lateral angle may have the same magnitude as the second lateral angle; each of the first vertical angle, the second vertical angle, the first lateral angle, and the second lateral angle may be between about 45 degrees; a first stream of the first dispenser may not overlap with a second stream of the second dispenser; each of the first dispenser and the second dispenser may include a flat fan pattern spray nozzle; a sensor configured to detect the substrate and generate a signal, and a control circuit configured to process the signal to extract at least one dimension of the substrate and adjust the angles of the dispensers based on the at least one dimension; the conveyor configured to convey the substrate along the conveyance axis.

A fourth embodiment is directed to a method of dispensing a material onto a plurality of substrates positioned on a conveyor. The method may include receiving, with a control circuit, at least one dimension of the plurality of substrates, and receiving, with the control circuit, a distance between adjacent substrates of the plurality of substrates. The method may also include adjusting an angle of at least one dispenser relative to the conveyor based on the at least one dimension and the distance, and applying, with the dispenser, the material onto the at least one substrate.

The method may further include one or more of the following features: wherein receiving the at least one dimension includes receiving a height of the plurality of substrates; receiving, with the control circuit, a desired thickness of the material on a surface of the plurality of substrates, wherein the adjusting the first angle and the second angle is further based on the desired thickness; detecting the plurality of substrates to generate a signal, and processing, with the control circuit, the signal to determine the at least one dimension and/or the distance.

Control System for Applying a Material Based on Viscosity

A fifth embodiment is directed to a system for circulating a fluid material in a flow circuit, and for periodically applying at least some of the material onto a substrate. The system may include a control system for adjusting the application of the material onto the substrate. The control system may include a pressure sensor configured to detect a pressure of the flow of the material through the flow circuit, and a flow sensor configured to detect a flow rate of the flow of the material through the flow circuit. The control system may also include a control circuit in communication with the pressure sensor and the flow sensor. The control system may be configured to determine a viscosity of the material based on the detected pressure and the detected flow rate, compare the determined viscosity to a reference value, and generate a signal to modify an application pressure based on the comparison.

The system may further include one or more of the following features: the control circuit may be configured to modify the application pressure by adjusting a pressure of the pump; the control circuit may be configured to direct the signal to a display to indicate to a user to modify the amount of the material in the system; the material may include at least one of chocolate, oil, icing, and butter; the comparing the determined viscosity may include determining if the viscosity is below a first reference value of a range or above a second reference value of the range; a dispenser may be configured to apply the material onto a surface of a substrate.

A sixth embodiment is directed to a method of adjusting an application of a material to a substrate. The method may include detecting, with a pressure sensor, a pressure of the material in a flow circuit, and detecting, with a flow sensor, a flow rate of the material in the flow circuit. The method may also include determining, with a control circuit, a viscosity of the material based on the detected pressure and the detected flow rate, comparing, with control circuit, the determined viscosity to a reference value, and generating, with the control circuit, a signal to adjust an application pressure based on the comparison.

The method may further include one or more of the following features: adjusting, in response to the signal, a pressure of a pump of the flow circuit; displaying, in response to the signal, an indication to a user to modify an amount of the material in the system; the material may include at least one of chocolate, oil, icing, and butter; the comparing the determined viscosity may include determining if the viscosity is below a first reference value of a range or above a second reference value of the range; applying the material onto a surface of the substrate.

Control for Temperature Fall-Back

A seventh embodiment is directed to a control system for preventing the overheating of a material in a conduit. The control system may include a heating device configured to apply heat to the material, a flow sensor configured to detect a flow rate of the material, and a control circuit in communication with the heating device and the flow sensor. The control circuit may be configured to compare the detected flow rate to a reference value and generate a signal to the heating device to reduce or interrupt the heat applied to the material based on the comparison.

The control system may further include one or more of the following features: the control circuit may be configured to generate the signal to power off the heating device for a predetermined time period and power on the heating device at a reduced temperature relative to a running temperature; the reduced temperature may be about 105-110° F., and the running temperature may be about 125-180° F.; the predetermined time period may be about two minutes; the control circuit may be further configured to determine if the detected flow rate exceeds the reference value, and increase the heat generated by the heating device based on the detected flow rate exceeding the reference value; the control circuit may be configured to increase the heat in a step-wise function; a plurality of heating devices may be configured to apply heat to the material at different temperature zones of the conduit, wherein the control circuit may be configured to generate different signals for each of the temperature zones; the control system may be configured to maintain constant heat applied to at least one of the temperature zones; wherein reducing the heat applied includes reducing at least two of the temperature zones to different reduced temperatures.

An eighth embodiment is directed to a method of preventing the overheating of a material in a conduit. The method may include applying, with a heating device, heat to the material in the conduit at a running temperature, and detecting, with a flow sensor, a flow rate of the material through the conduit. The method may also include comparing, with the control circuit, the determined flow rate to a reference value and reducing, with the heating device, the heat applied to the material based on the comparison.

The method may further include one or more of the following features: wherein reducing the heat applied includes powering off, with the control circuit, the heating device for a predetermined time, and powering on, with the control circuit, the heating device at a reduced temperature relative to the running temperature; the reduced temperature may be about 105-110° F. and the running temperature may be about 125-180° F.; the predetermined time period may be about two minutes; determining, with the control circuit, if the detected flow rate exceeds the reference value, and increasing, with the control circuit, the heat generated by the heating device based on the detected flow rate exceeding the reference value; wherein the control circuit is configured to increase the heat in a step-wise function; wherein the increasing the heat applied by the heating device is performed in a step-wise function until the heating device reaches the running temperature; applying, with a plurality of heating devices, heat to the material at different temperature zones of the conduit; maintaining, with the control circuit, constant heat applied to at least one of the temperature zones, wherein the reducing the heat applied include reducing at least two of the temperature zones to different reduced temperatures.

BRIEF DESCRIPTION OF THE DRAWINGS

FIG. 2 illustrates an exemplary hydraulic pump and actuator assembly in side elevation.

FIG. 3 illustrates an exemplary longitudinal cross-section along the line 3-3 in FIG. 2 showing detail of an air motor.

FIG. 5 illustrates an exemplary pump and pump mounting assembly in side elevation.

FIG. 6 illustrates an exemplary longitudinal cross-section of the pump and pump mounting assembly of FIG. 5 taken along the line 6-6 in FIG. 5.

FIG. 8 illustrates an exploded view of the pump and pump mounting assembly of FIG. 5.

FIGS. 10-12 illustrate an alternative embodiment for a heating device, with similar views with respect to the views of FIGS. 5, 6, and 8.

FIGS. 13-15 illustrate another alternative embodiment for an internal heating device for a pump, with similar views to the views of FIGS. 5, 6, and 8.

FIG. 16 illustrates some embodiments of a filter having an internal heating device, in isometric view.

FIG. 20A illustrates an embodiment of an exemplary containment system.

FIG. 20B illustrates an exemplary embodiment of the interior of the containment system of FIG. 20A.

DETAILED DESCRIPTION

Figure 1:
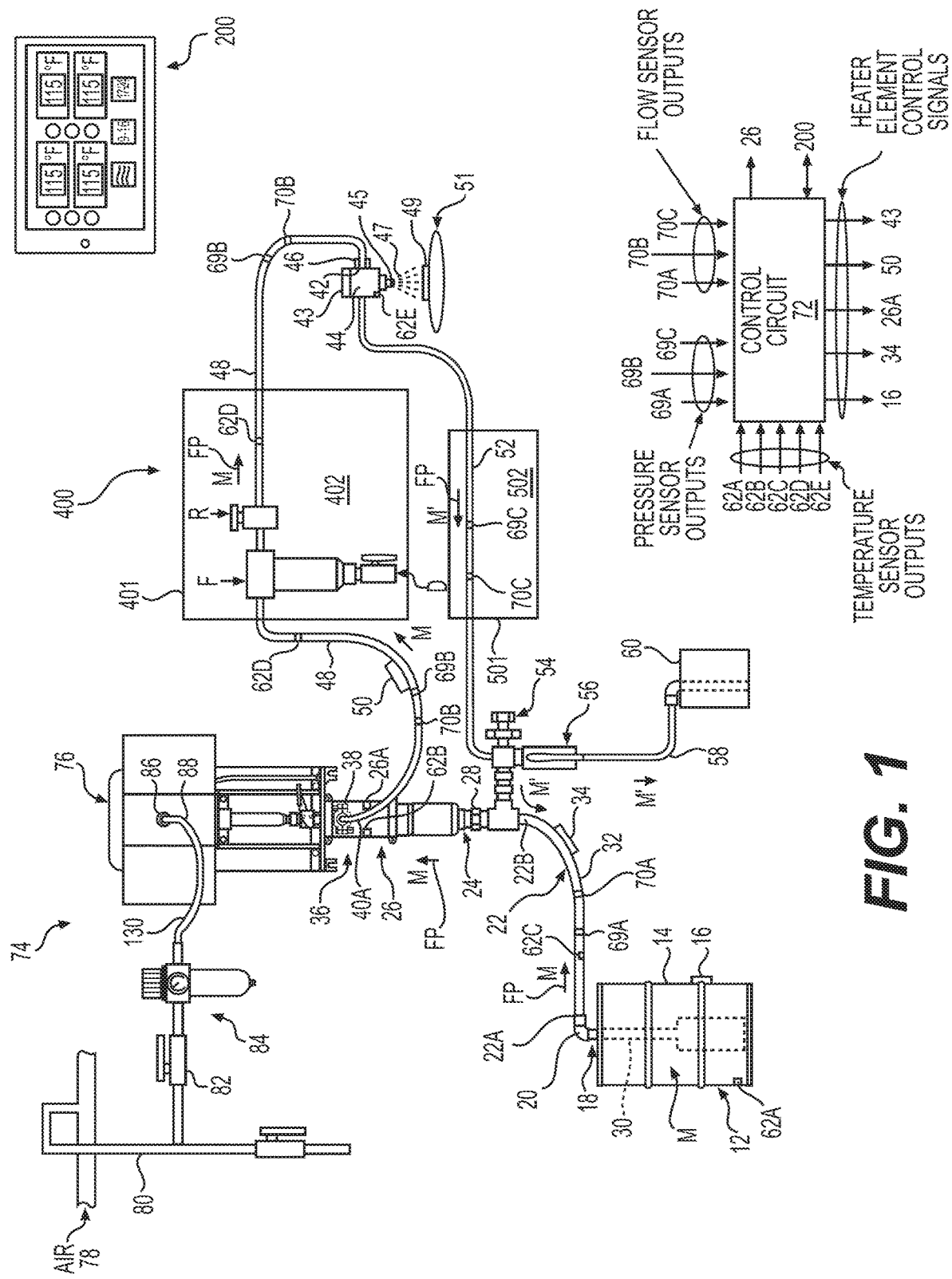
FIG. 1 illustrates an exemplary system for conveying and dispensing heated material.

The disclosure is generally directed to a system for conveying and dispensing heated material that is solid or more viscous at an ambient temperature. In some embodiments, the apparatus may include a heated source for the material, one or more heated conduits, a heated or unheated dispenser, and a pump having an internal heating device. For example, the pump may include one or more heating devices disposed within an outermost surface of the pump. In some embodiments, the dispensed material may include food materials, such as chocolate, cocoa butter, chocolate compound, cooking oil (e.g., vegetable oil), and/or butter. In some embodiments, the system may also include a filter apparatus with an internal heating device, for example, positioned within an outermost surface of the filter apparatus. It is also contemplated that filter may be configured to receive heater cartridges. In some embodiments, the system may include one or more insulated containers configured to enclose components of the system, such as unheated conduits, filters, and/or regulators. The system may also include one or more control systems configured to perform methods to improve the application of the material. For example, the control system(s) may include a control circuit and one or more sensors and actuators configured to control aspects of the application of the material. The control system(s) may be configured to detect parameters, such as flow rates and viscosities, and manipulate components to improve the application of the heated material.

While the exemplary embodiments herein are directed to conveyance and dispensing heated food material such as, chocolate compound onto a surface of a food product, such embodiments are exemplary and are not intended to be limiting. The present disclosure also finds application with many different food materials, including but not limited to chocolate, oil, butter, and icings; as well as to non-food materials, such as adhesives, silicones, plastics, and rubbers. Also, the disclosure may be applied to dispensing heated material onto any surface, not just food product surfaces. For example, the system may be configured to apply material to surface, such as circuit boards and semi-conductors. As used herein, heating devices may include a number of different devices that applies heat to a material conveyed by a pump. In some embodiments, a pump heating device may embody an electrical heating device disposed internal the pump. However, the pump may include, additionally or alternative, other types of heating devices.

We refer herein to heated materials as materials that are less viscous when heated than at ambient temperature, such that heat is added to the material over and above any heating that might occur due to the ambient environment. By ambient temperature we mean the surrounding environment of the pump that is exterior the pump, such as room temperature. In some embodiments, the material (e.g., chocolate, butter, or oil) may be solid or more viscous at ambient temperature than when the material is heated. An example of room temperature is approximately 68° F. to approximately 77° F., however, this range of temperatures is not limiting. For example, chocolate may need to be heated at approximately 100° F. to 130° F., and maintained within a range (e.g., approximately ±2° F.) as the material is conveyed from a supply to a dispenser.

System for Conveying and Dispensing Heated Material

With reference to FIG. 1, a system 10 for conveying and dispensing a heated material M onto a substrate 49 is represented in schematic form. In some embodiments, the system 10 may include a supply 12 for the heated material M. The supply 12 may be, for example, a heated container 14 configured to contain and heat the heated material M to a selected temperature or within a selected temperature range. The heated material M may be, for example, a material that at room temperature is solid or highly viscous. Examples of the heated material M include but are not limited to chocolate, butter, oil, and icings. A supply heating device 16 may be in heat transfer or thermal exchange relationship with the container 14 so that the material M may be heated to the selected temperature or temperature range that typically may be above room temperature. For example, the heated material M may be heated in the range of approximately 100° F. to approximately 130° F., each within a range of approximately +2° F. for example, for conveying the heated material M from the supply 12 to one or more dispensers 44. The dispenser(s) 44 may apply the heated material M onto the substrate 49 advanced on a conveyor 51. Examples of the substrate 49 include but are not limited to wafers, cookies, breads, crackers, and meat.

The supply 12 may include a supply outlet 18 with a first supply hose connector 20 attachable thereto. The first supply hose connector 20 may be connected to a first end 22a of a supply conduit 22. A second end 22b of the supply conduit 22 may be connected to a pump inlet 24 of a pump 26 with a second supply hose connector 28. The first end 22a of the supply conduit 22 may be connected to a siphon tube 30 through which the heated material M is drawn up into the supply conduit 22 by negative pressure or suction that is produced at the pump inlet 24 of the pump 26. In some embodiments, an upper end of the siphon tube 30 may function as the supply outlet 18. The pump 26 may be a suction or siphon type pump. The supply 12 may, additionally or alternatively include a pump that generates positive pressure to the heated material M from the supply 12. The second end 22b of the supply conduit 22 may be connected to a T-connection for a recirculation valve 54. The recirculation valve 54 may be omitted to provide a fixed orifice.

The supply conduit 22 may be any conduit or hose that provides a flow path for the heated material M from the supply 12 to the pump inlet 24. In some embodiments, the supply conduit 22 may include a supply hose 32 connected to a supply hose heating device 34 configured to apply heat to heated material M in supply hose 32. Alternatively, the supply heating device 34 may be omitted if the supply hose 32 is of a length and design so that there is an acceptable loss or no loss of heat or temperature between the heated supply 12 and the pump inlet 24, or where the supply hose 32 is enclosed by an insulated container, as discussed herein.

The pump 26 may be driven by a number of different types of actuators 74. In some embodiments, the pump 26 may include a piston style hydraulic displacement actuator. For example, the pump 26 may include a linear displacement actuator such as the air motor 76. But many different types of air motors may be used, as well as alternatively many different types of actuators may be used, including but not limited to an electric motor. Moreover, many different pump configurations and types may alternatively be used other than a piston type pump, in which cases the pump actuator 74 may be selected for the particular type of pump 26 used. The air motor 76 may operate from ambient air 78 such as plant air 78 for the facility where the system 10 is installed. A drop leg 80 may be used to branch off air to the air motor 76, and an air shut off valve 82 and an optional air filter/regulator/gauge assembly 84 may be provided as needed. The air motor 76 may include an air inlet 86 that is connected to an air hose 88 from the filter/regulator/gauge assembly 84.

The pump 26 may include a pump outlet 36 with a suitable first feed conduit connector 38 attachable thereto. In some embodiments, the first feed conduit connector 38 may include a clamp. The first feed conduit connector 38 may be further connected to a first end 40a of a feed conduit 40. A second end 40b of the feed conduit 40 may be connected to a dispenser inlet 42 of one or more dispenser(s) 44 with a second feed conduit connector 46. The pump 26 may discharge pressurized heated material M through the pump outlet 36 into the feed conduit 40. The pump 26 may include a pump heating device 26a.

The feed conduit 40 may be any pressure conduit or pressure hose that provides a flow path for the heated material M from the pump outlet 36 to the dispenser inlet 42. In some embodiments, the feed conduit 40 may include a pressure feed conduit 48 and a heating device 50 configured to apply heat to heated material M within the feed conduit. The feed conduit 40 may also include a feed conduit temperature sensor 62D configured to detect the temperature of heated material M within pressure feed conduit 48.

The system 10 may further include a filter F with an optional drain valve D. and a regulator R disposed in-line with the pressure feed conduit 48. In some embodiments, the filter F may include an internal heating device, for example, including structure similar to the heating device 26a for the pump 26, or may be unheated. The regulator R may be any suitable regulator, for example, a manually operated regulator. The regulator R may, additionally or alternatively, include one or more step motors (not shown) configured to adjust the pressure of the heated material M, for example, based on a signal from the control circuit 72. The filter F and the regulator R may divide the pressure feed conduit 48 into one or more discrete segments. The filter F and/or the regulator R may be unheated and enclosed in a heated container 401.

The dispenser(s) 44 may include a number of different types of dispensers suitable for dispensing the heated material M onto the substrate 49. The dispenser(s) 44 may be configured to selectively dispense a stream 47 of the heated material M onto the substrate 49 based on an adjustable orifice 45. Examples of dispensers that may be used include but are not limited to the Blue Series™ brand of applicators available from Nordson Corporation, Westlake, Ohio noted above. Dispenser(s) 44 may be heated or unheated. In some embodiments, the dispenser(s) 44 may include a dispenser heating device 43, for example a heated manifold, and/or other heating devices that provide heat to the heated material M to maintain the selected temperature range of the heated material through the dispenser 44 and to the dispensing orifice 45. In some embodiments, the dispenser heating device 43 may be integrated into the bottom of the dispenser(s) 44. In some embodiments, the dispenser heating device 43 may be omitted. The dispenser(s) 44 may be oriented at a number of different angles relative to the conveyor 51. For example, the dispenser(s) 44 may be oriented at compound angles relative to the conveyor 51 in order to selectively apply one or more coats to sides of the substrate 49. In some embodiments, the system 10 may include a plurality of dispensers 44 arranged in a mirrored configuration relative to the conveyor 51, as further discussed regarding FIGS. 21A-C. Branching pressure feed conduits 48 may provide the heated material M, for example, through a Y-coupling. Branching return conduits 52 may similarly be downstream of the plurality of dispensers 44.

The system 10 may optionally include a pressurized return conduit 52 that connects to an optional recirculation valve 54. When the dispenser(s) 44 is not applying the heated material M onto the substrate 49, it may be desirable to return the heated material M' to the supply 12 via the supply hose 32. This may be done by opening the circulation valve 54. If the system 10 is being cleaned or purged, an optional drain valve 56 may be opened to admit flow of the material M' into a drain hose 58 to a waste container 60 or other container or disposal site.

In some embodiments, the system 10 may include one or more insulated containers 401, 501 configured to enclose components of the system 10. For example, the insulated container(s) 401, 501 may be configured to provide an environment controlled chamber 402, 502 enclosing unheated components of the system 10. For example, as depicted in FIG. 1, insulated container 401 may enclose at least an unheated portion of unheated pressure feed conduit 48, an unheated filter F. and/or an unheated regulator R upstream of the dispenser(s) 44. A second insulated container 501 may enclose components of the system 10 (e.g., conduit 52) downstream of the dispenser(s) 44, such as flow sensor 69C and pressure sensor 70C. The second insulated container 501 may, additionally or alternatively, enclose one or more of exposed sections of the conduits, the recirculation valve 54, ball valves, and/or a spray pressure control manifold (not shown). At least one aperture may be provided through a wall of the insulated container(s) 401, 501 to be coupled to conduit 48, 52 to provide a flow path in and out of the chamber(s) 402, 502. Insulated container(s) 401, 501 may include a rigid material lined with an insulating material, and a hinged door to allow access to the chamber (as depicted in FIGS. 20A-20B). Insulated container(s) 401, 501 may also enclose instruments to control the environment of the chamber, such as a heating device, a temperature sensor, and a fan (as further depicted in FIGS. 20A-20B).

The heating devices of the system 10 may include resistive heating devices, inductive heating devices, and/or magnetostrictive heating devices. The heating devices may be included by the manufacturer of the particular device. For example, a suitable applicator or dispenser 44 may be from the Blue Series™ brand of applicators available from Nordson Corporation. Westlake. Ohio; coil heaters as may be used for the pump heating device 26a are commercially available, for example, from NextThermal™, Battle Creek, Mich.; and hoses with hose heaters are commercially available, for example, the Automatic RTD Hoses line from Nordson Corporation, Westlake, Ohio. These devices are also available with temperature sensors (discussed herein).

The heating devices may be controlled based on a number of different inputs and may be configured to generate varied temperature zones for the heated material M in system 10. For example, one or more temperature zones of the system 10 may be raised above the desired running temperature of the material M in order to transfer sufficient heat to the heated material M as it circulates. For example, the heated material M may be rapidly flow in one or more of the temperature zones requiring additional heat to be applied. For instance, the heated material M may have a desired running temperature of about 110-115° F., but in one or more of the temperature zones, the heaters may apply heat sufficient to elevate the heated material to 125-180° F. Therefore, the system 10 may control the temperature zones to accommodate a wide variety of flow rates without expensive accumulators because the individual temperature zones may be controlled to provide sufficient heat. The heating devices may also be controlled based on a number of different inputs to reduce the risk of overheating, for example, if the flow were to slow or stop.

One or more temperature sensors may be configured to monitor the temperature of the heated material M along the flow path FP. For example, a supply temperature sensor 62A may be provided within the supply 12 to detect temperature of the heated material M within supply and produce an output signal. A pump temperature sensor 62B may be provided within the pump 26 to detect the temperature of the heated material M in the pump 26 and produce an output signal. A supply hose temperature sensor 62C may be provided in the supply hose 32 to detect temperature of the heated material M in the supply hose 32 and produce an output signal. The feed conduit temperature sensor 62D may be provided in the feed conduit 48 to detect temperature of the heated material M in the feed conduit 48 and produce an output signal, and a dispenser temperature sensor 62E to detect temperature of the heated material M in the dispenser 44 and produces an output signal. A number of types of temperature sensors may be used as needed, including but not limited to a resistance temperature detector or RTD type devices as are well known, thermostats, and thermocouples. The type of temperature sensor used and the degree to which a temperature sensor detects temperature of the heated material M may depend on the type of control system and overall system design that is implemented for a particular application. For example, in some embodiments, it may be desired to detect temperature with a higher degree of accuracy, whereas in some embodiments it may be sufficient to detect whether the temperature is above or below a desired range.

One or more flow sensors may be configured to measure the flow rate of the heated material M along the flow path FP. For example, a supply flow sensor 69a may be coupled to the supply hose 32 to detect the flow rate of the heated material M from the supply 12, a feed flow sensor 69b may be coupled to the feed conduit 48, and a return flow sensor 69c may be coupled to the return conduit 52. In some embodiments, multiple flow sensors 69(A-C) may be provided in one or more of the conduits 32, 48, 52 to increase detection of the flow rate. Flow sensors 69(A-C) may include a number of different structures. For example, flow sensors 69(A-C) may include a rotary potentiometer positioned inside of the conduits 32, 48, 52 and be configured to generate a signal based on the rate of fluid flow. In some embodiments, the flow sensors 69(A-C) may be positioned outside the conduits 32, 48, 52 and configured measure flow rate through laser-based interferometry and/or the Doppler-based measurements and generate a signal.

One or more pressure sensors may be used to measure the pressure of the heating material M along the flow path FP. For example, a supply pressure sensor 70a may be coupled to the supply hose 32 to detect the pressure of the heated material M from the supply 12, a feed pressure sensor 70b may be coupled to the feed conduit 48, and a return pressure sensor 70c may be coupled to the return conduit 52. In some embodiments, a plurality of pressure sensors 70(A-C) may be provided in one or more of the conduits 32, 48, 52 to increase detection. Pressure sensors 70(A-C) may include a number of different structures configured to detect the flow rate of the heated material M through conduits 32, 48, 52. For example, pressure sensors 70(A-C) may include a piezoelectric sensor configured to generate a signal based on the pressure of the heated material M. The pressure sensors 7(A-C) may measure flow rate through optical measurements and generate a signal.

A control circuit 72 may be in communication with the components of the systems, such as one or more of the heaters, the temperature sensors 62(A-E), the flow sensors 69(A-C), and the pressure sensors 70(A-C). The control circuit 72 may be a programmable circuit that receives the various sensor inputs and produces a heating device control signal 73 to, for example, control operation of the respective heating devices 16, 34, 26A, 50, and 43. The control circuit 72 may also be configured to generate control signals to other components of system 10, such as pump actuator 74 to adjust the fluid flow the heated material M.

The control circuit 72 may be realized in many different forms and configurations, including but not limited to a programmable microcontroller, a PLC, discrete circuit components, and ASIC-type controllers to execute an appropriate control algorithm, for example a closed loop PID control method. The type of control signal 72 generated and the control algorithm used to control the heating devices may be selected based on the type of heating device used and the degree of control required for particular applications. For resistive heaters, the control circuit 72 may be configured to produce control signals that adjust one or more of current, voltage, frequency, amplitude and cycle on/off times to the heating device in order to control the amount of heat generated to control and maintain the temperature of the heated material M within the selected temperature range. The control circuit 72 may be configured to maintain the temperature of the heated material M during operation of the dispenser 44 as well as during recirculation of the heated material M and M' when the dispenser 44 is not operating to dispense material onto the substrate 49. The control circuit 72 may also be configured to actuate the pump actuator 74 to adjust the flow rate of the heated material M and/or the amount of the heated material M in system 10, for example, based on signals from the temperature sensors 62(A-E), the flow sensors 69(A-C), and the pressure sensors 70(A-C). The control circuit 72 may further be configured to adjust other components, such as the spray settings of the dispenser(s) 44.

A user interface 200 may be configured to transmit data to/from control circuit 72, and may be configured to receive input from a user and/or generate output to the user. The user interface 200 may include a personal computer, a smart phone, a tablet, and/or a wearable device. The user interface 200 may include a display that depicts a graphical user interface of applications to the user. The user interface 200 may also include a touch-sensitive surface, a stylet, a keyboard, buttons, a mouse, and/or a pointer. For example, the user interface 200 may be configured to control running temperatures and reduced temperatures of different components of the system 10. The user interface 200 may enable the user adjust the heaters to establish different temperature zones throughout the system 10. The user interface 200 may also be configured to output notifications to the user when modifications to the system 10 are required.

In sum, the system 10 thereby provides a heated flow path (represented by the directional arrows FP in FIG. 1 with the reference M for the heated material in the flow path) to convey the heated material M from the heated supply 12, through the supply conduit 22, through pump 26, through the feed conduit 40 to the dispenser 44. In some embodiments, one or more of the supply 12, the supply conduit 22, the pump 26, the feed conduit 48, the dispenser 44, and/or insulated containers 401, 501 may include a heating device. The heating devices may maintain the heated material M at a desired temperature along the flow path FP for the entire conveyance and dispensing operations. The system 10 may also be configured to manipulate components of the system 10 based on signals received from sensors to improve the dispensing of the heated material M.

Hydraulic Pump and Actuator Assembly

Figure 4:
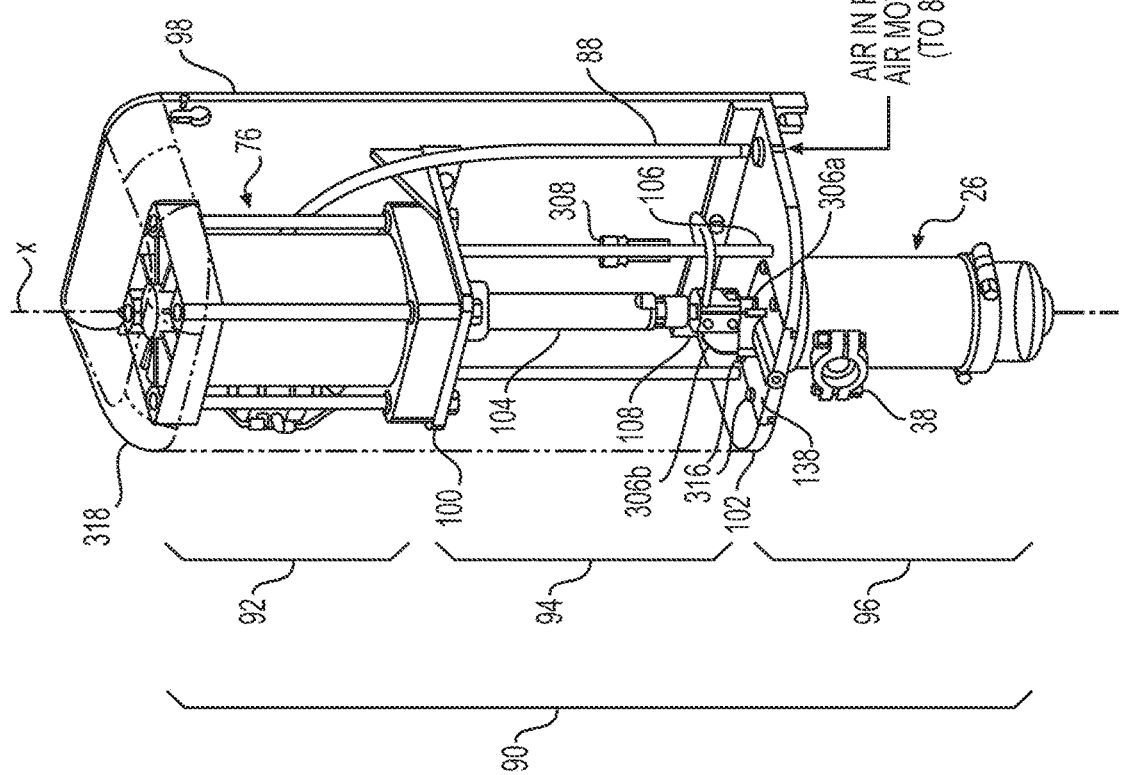
FIG. 4 illustrates an exemplary isometric view of a hydraulic pump and actuator assembly for conveying and dispensing heated material illustrated in FIG. 1.

As depicted in FIGS. 2 and 4, in some embodiments, a hydraulic pump and actuator assembly 90 may include an actuator section 92, a drive train section 94, and a hydraulic section 96. The actuator section 92 may be realized in the form of the air motor 76 and the hydraulic section 96 may be realized in the form of the pump 26. In some embodiments, the pump 26 may be a hydraulic pump as described herein. The drive train section 94 may provide a mechanical coupling between the air motor 76 and the pump 26 so that operation of the air motor 76 produces linear actuation or drive for the pump 26. The air motor 76 and the pump 26 may be supported, for example, on a structural wall or panel 98 or any other suitable structure. The air motor 76 may rest on a first shelf 100 that is mounted to the wall 98, and the pump 26 may be supported to depend from a second shelf 102 that is mounted to the wall 98. The air motor 76 may include a piston shaft 104 that is coupled to a plunger 106 by way of a coupling 108.

With reference to FIG. 3, in some embodiments the air motor 76 may include a pneumatic piston 110 that is received in and divides a piston pressure chamber 112 into an upper portion 112a and a lower portion 112b. The piston 110 may include a piston head 114 and the piston shaft 104 that may extend down into the drive train section 94. One or more piston seals 116 may be used to provide a dynamic or sliding seal between the piston head 114 and a piston pressure chamber wall 118. A first air inlet 120 provides pressurized air into the upper portion 112a of the piston pressure chamber 112 above the piston head 114, and a second air inlet 122 provides pressurized air into the lower portion 112b of the piston pressure chamber 112 below the piston head 114. A control valve 124, such as a slide valve or spool valve, may be used to switch and control when pressurized air at the air motor inlet 86 is fluidly connected to the first air inlet 120 or the second air inlet 122. A sensor (not shown) or other means may be used to determine the piston head 114 position so as to cause the control valve 124 to switch between the first air inlet 120 and the second air inlet 122, thereby producing reciprocating linear actuation and movement (represented by the double headed directional arrow in FIG. 3) of the piston shaft 104 relative to an axis X.

The piston shaft 104 may be connected to the plunger 106 by any suitable coupling 108 noted above. Preferably, axial translational movement of the piston shaft 104 along the axis X causes axial translational movement of the plunger 106 relative to the axis X. Alternatively, the piston shaft 104 and the plunger 106 need not be coaxially aligned. In some embodiments, the coupling 108 may be a clamp or sleeve style coupling for example or other suitable coupling. Preferably, the coupling 108 may allow the piston shaft 104 to be uncoupled easily from the plunger 106 without having to axially move either the air motor 76 or the pump 26, for reasons that will be further explained herein in an optional embodiment. If the piston shaft 104 and the plunger 106 have different outside diameters, a coupling adapter 126 may be used as needed.

An air hose fitting 128 may be provided to connect an air supply hose 130 to the air motor inlet air hose 88. The air supply hose 130 may receive the pressurized plant air noted herein.

With reference next to FIGS. 5-8, the pump 26 may be an on-demand double acting hydraulic siphon pump. By on-demand, it is meant that the pump only operates when the dispenser 44 or other downstream application begins to draw heated material M from the pump outlet 36. When a demand for the heated material M is made, either by operation of the dispenser 44 or a recycling mode of operation, or by another downstream device, in effect this opens the pump outlet 36 to flow and reduces the pressure of the heated material inside the pump chamber, which causes the air motor 76 to resume operation. By double acting is meant that the pump 26 operates to discharge heated material through the pump outlet 36 continuously during both strokes of the plunger 106. As a siphon pump, the pump 26 generates suction at the pump inlet 24 which aspirates or draws heated material M into the pump 26 from the supply 12.

In some embodiments, the pump 26 may include a heating device casing 132 that closely surrounds a pump chamber cylinder 134 (also referred to herein as the pump body or pump cylinder 134). The pump cylinder 134 delimits an interior pump chamber 136, through which the heated material M is pumped under pressure from the pump inlet 24 to the pump outlet 36 (note in FIG. 7 that the pump outlet 36 is not visible). The heating device casing 132 may closely surround and preferably is attached to an exterior surface 134a of the pump cylinder 134. The pump chamber 136 may be closed at an upper end with a pump head 138 and may be capped at a lower end with a siphon housing and check valve assembly 140. A first gasket 142 may be used to provide a pressure and fluid tight seal interface between the pump cylinder 134 and the pump head 138. A second gasket 144 may be used to provide a pressure and fluid tight seal interface between the pump cylinder 134 and the siphon housing and check valve assembly 140.

It will be noted that the plunger 106 extends through an aperture 146 in the pump head 138 so as to be connectable on its distal end to the coupling 108 (FIG. 3). The pump head 138 may include a pump head tapered relief 148 and the pump cylinder 134 may include a cylinder tapered relief 150 to allow a first clamp 152 to securely mount the pump cylinder 134 onto the pump head 138. Similarly, a second or siphon housing clamp 154 may be used to mount the siphon housing and check valve assembly 140 to the pump cylinder 134. The design of the clamps 152 and 154 may be, for example, a food fitting sanitary connection as are well known in the art.

The pump outlet 36 may include an outlet port 156 that may extend transversely through the wall of the pump cylinder 134 and the heating device casing 132. The outlet port 156 is open to the interior pump chamber 136 and admits discharge or out-flow of the heated material M as the heated material is pumped and pressurized between the pump inlet 24 and the pump outlet 36. A fixed position dynamic seal 158 surrounds the plunger 106 and is retained in place by a seal plate 160 that may be attached to the pump cylinder 134 by screws 162. The seal plate 160 applies a compressive load against the fixed position dynamic seal 158 so that the dynamic seal 158 is radially loaded against the plunger 106 outer surface. The dynamic seal 158 may be any suitable seal device, for example, a U-cup type piston seal as are well known. The seal 158 is preferably a dynamic seal-type device because of the sliding contact between the seal 158 and the plunger 106 outer surface when the pump is operating. An o-ring or other suitable static seal 164 provides a seal interface between the pump head 138 and the seal plate 160. The static seal 164 serves to prevent fluid such as water or other contaminants from entering the pump 26 interior during wash down or other maintenance activities.

Figure 7:
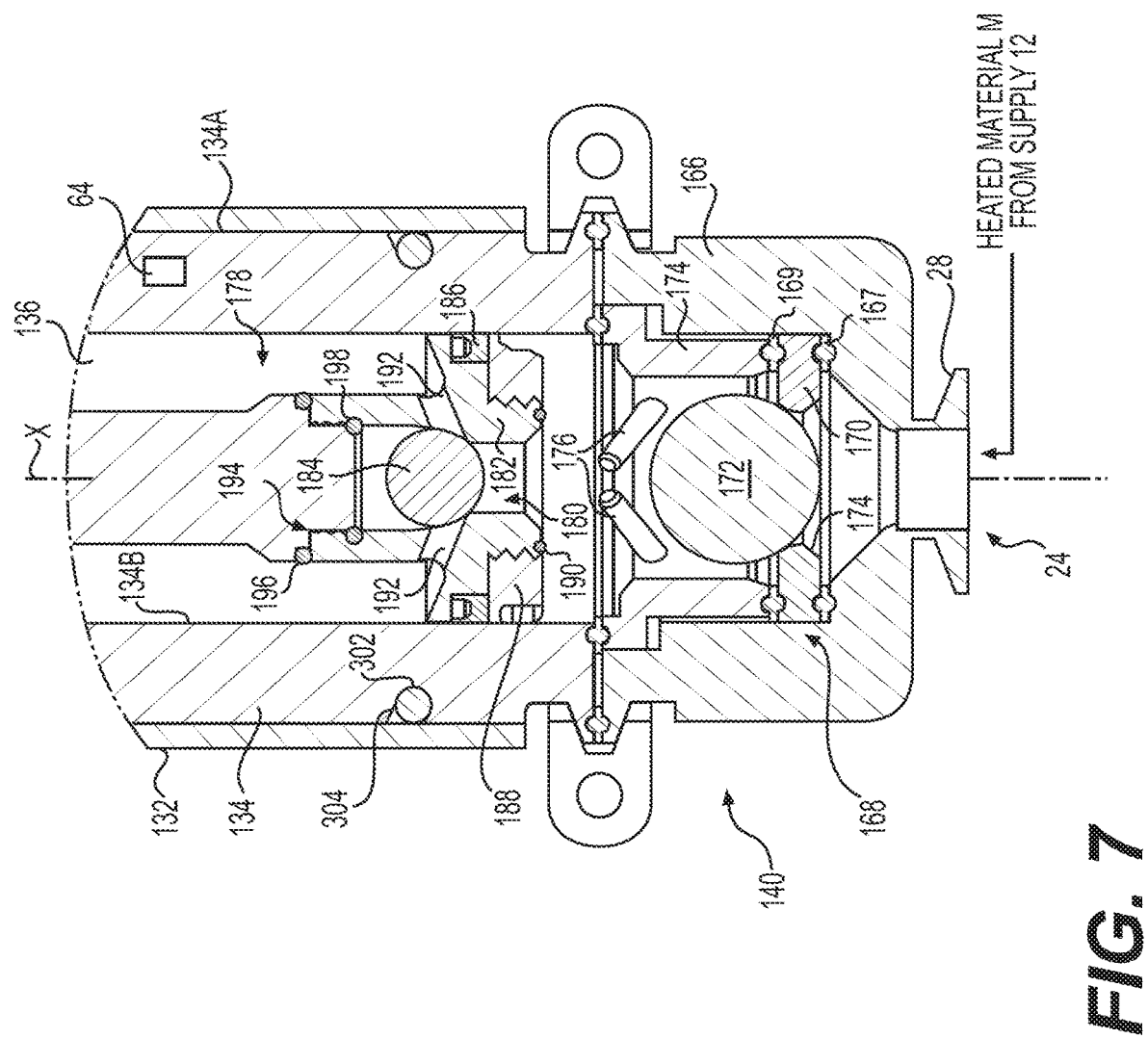
FIG. 7 illustrates an enlarge view of the circled portion of FIG. 6.

With particular reference to FIG. 7, the siphon housing and check valve assembly 140 may include a siphon housing 166, a first or siphon check valve 168 that may include a siphon check valve seat 170, a siphon check valve member 172 which in some embodiments may be a spherical ball, a siphon ball cage 174 and one or more siphon ball retention members 176. The siphon check valve 168 is open (i.e. the siphon ball valve member 172 is unseated from the siphon check valve seat 170) when the plunger 106 is moving with an axially upward stroke; and the siphon check valve 168 is closed (i.e. the siphon ball valve member 172 is seated against the siphon check valve seat 170) when the plunger 106 is moving with an axially downward stroke. The siphon check valve seat 170 presents an inlet orifice to the pump chamber 136 and admits heated material M into the pump chamber 136 from the supply 12 during one half of the pump 26 stroke cycle. The siphon housing 166 may be connected to a lower end of the pump cylinder 134 using the second or siphon housing clamp 154. A gasket 155 may be used as needed to provide a fluid tight seal between the siphon housing 166 and the pump cylinder 134. The siphon check valve seat 170 is held securely between the siphon housing 166 and the siphon ball cage 174. Gaskets 167, 169 may be used as needed to provide a fluid tight seal interface between the siphon check valve seat 170 and the siphon housing 166 and the siphon ball cage 174. The siphon housing 166 also may include one-half of the supply hose connector 28.

The siphon ball cage 174 helps to align the siphon ball valve member 172 with the siphon valve seat 170, and the siphon ball retention members 176 restrict axial movement of the siphon ball valve member 172 when the siphon valve 168 is open. The siphon ball retention members 176 may be realized in any suitable form and in some embodiments may comprise one or more dowel pins attached to the siphon ball cage 174 and that extend at least partially over the ball valve member 172.

During an upward stroke of the plunger 106, a negative pressure is produced in the siphon housing 166 which draws in heated material M through the open siphon check valve 168. During a downward stroke of the plunger 106, positive pressure reseats the ball valve member 172 against the siphon check valve seat 170 to close the siphon check valve 168. The reciprocating nature of the plunger axial stroke is represented by the double headed directional arrow in FIGS. 3 and 6.

A second or upper check valve assembly 178 may include a second check valve 180, a second check valve seat 182, a second check valve member 184 which may be in the form of a spherical ball, a second dynamic seal 186, a seal retainer 188 and a second static seal 190. The second check valve seat 182 may include an extended portion 182a that serves as a ball cage. The second check valve seat 182 also may include one or more fluid passages 192 that admit flow of heated material M into the pump chamber 136 when the second check valve 180 is open. The second check valve 180 is open during the axially downward stroke of the plunger 106 and is closed during the axially upward stroke of the plunger 106. In other words, the second check valve 180 is open when the siphon check valve 168 is closed and the second check valve 180 is closed when the siphon check valve 168 is open. In this manner, the pump 26 is a double acting pump whereby heated material M is discharged out of the pump chamber 136 continuously during both the upward stroke and the downward stroke of the plunger 106. The second dynamic seal 186 provides a dynamic seal interface with the pump cylinder interior surface 134b. The seal retainer 188 may be threadably connected with the second check valve seat 182 and applies a compressive load against the second dynamic seal 186 so that there is a radial load between the second dynamic seal 186 and the interior surface 134b of the pump cylinder 134. The second static seal 190 provides a seal to protect the threaded connection between the seal retainer 188 and the second check valve seat 182 and may be any suitable seal, for example, an o-ring.

The fluid passages 192 are sized so that on the upward stroke of the plunger 106, the second check valve 180 is closed so that heated material M that is above the second check valve 180 is under pressure and is discharged out through the pump outlet 36. At the same time, heated material M is drawn into the pump chamber 136 because the siphon check valve 168 is open. During the downward stroke of the plunger 106, the siphon check valve 168 is closed and the second check valve 180 is open so that heated material M is forced under pressure through the fluid passages 192 and is discharged out through the pump outlet 36. In this manner, heated material M is always present in the pump chamber 136 and continuously flows out of the pump outlet 36 when the pump 26 is running steady state. The pump 26, therefore, functions as a double acting continuous flow on-demand siphon pump. The on-demand feature operates (so long as the air motor has inlet air pressure) because when demand is removed (the plunger 106 will stop when demand is removed because back pressure will result in pressure balance on either side of the second check valve assembly 178), regardless of where the plunger 106 stroke stops and regardless of the direction of movement of the plunger 106 when the plunger 106 stops, as soon as there is a demand for the heated material M, the momentary drop in pressure in the pump cylinder 134 will allow the air motor 76 to move the plunger 106.

The second check valve seat 182 may have a threaded connection 194 to the plunger 106 with third and fourth static seals 196, 198 such as o-rings, for example, to seal the threaded connection 194 for sanitary reasons.

Figure 9:
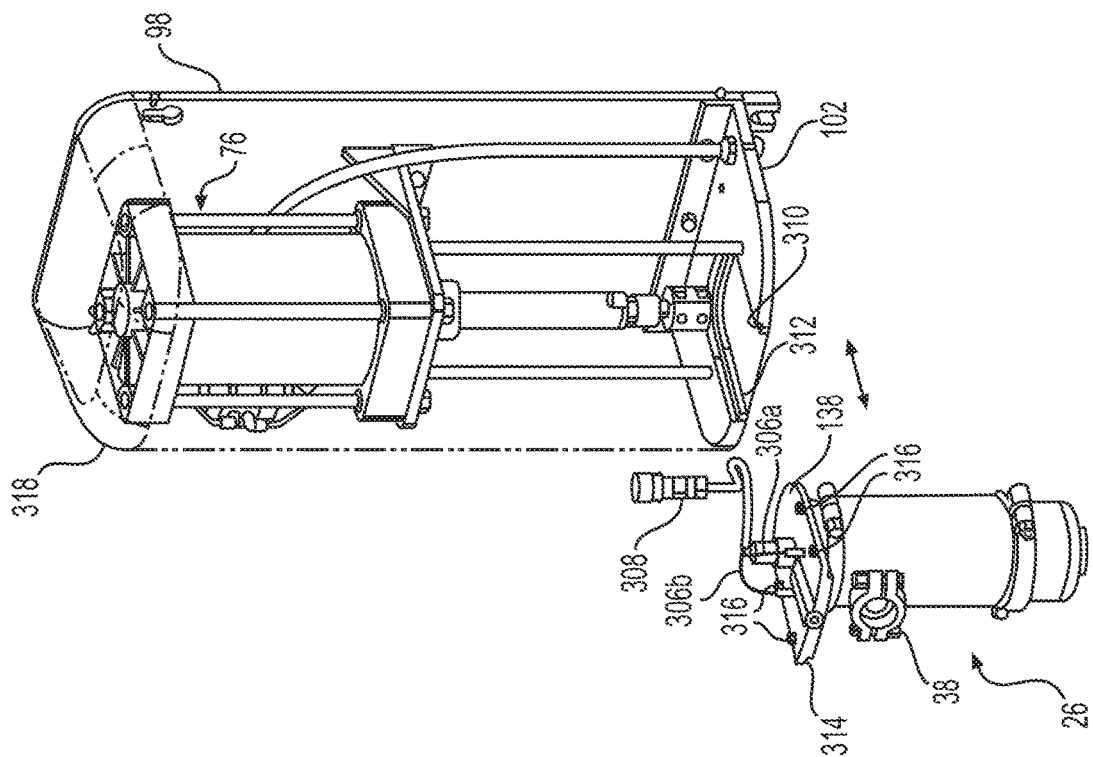
FIG. 9 illustrates a disassembled and disconnected position of the pump from the air motor and supporting structure.

With reference to FIGS. 5, 8 and 9, the pump heating device 26a is shown to be disposed internal of the pump 26. By internal it is meant that the heating device generates heat that is conducted to the heated material M within the pump chamber 136 as the heated material flows through the pump chamber 136, with the pump heating device 26a being disposed within an outermost housing or exterior shell surface of the pump 26. Therefore, an internal heating device may be distinguished from an external heating device wherein the latter would be located outside the surface of the outermost housing or exterior shell of the pump 26, and therefore would necessarily provide heat to the heated material M either before the heated material M enters into the pump inlet 24 or after the heated material M exits the pump outlet 36. A pump heating device 26a as used herein may be realized, for example, with a heating device that may be disposed within the pump 26 structure or in direct thermal exchange with a pump structure that encloses the pump chamber 136.

In some embodiments, the pump heating device 26a may be realized in the form of a heating device 300 that may be attached to the pump chamber cylinder 134. The heating device 300 may include a resistive wire bundle or cable 302 that generates heat when electric current passes therethrough. For example, the heating device 300 may be a single continuous wire bundle or may include multiple wired bundles or a single conductor. Copper wire is an example of a material that may be used for the heating device.

The heating device 300 preferably is flexible and may be attached to the pump chamber cylinder 134 so as to be in intimate thermal heat exchange with the pump cylinder 134, thereby providing heat transfer from the heating device 300 into the interior pump chamber 136. As illustrated in FIGS. 5 and 7, in some embodiments, the heating device 300 may be disposed in a groove or recess 304 that may formed in an exterior surface 134a of the pump cylinder 134. The heating device 300 may be press fit or swaged into the groove 304 so as to provide intimate and strong contact between the heating device 300 and the pump cylinder 136. By staking the heating device 300 into the groove 304, the heating device 300 may be stable and securely held in place regardless of temperature excursions. By recessing the heating device 300 from the exterior surface 134a, the heating device casing 132 may be positioned on the pump cylinder 134 with a smooth appearance and also to minimize gaps between the heating device casing 132 and the pump cylinder 134. However, recessing the heating device 300 may not be required. Preferably, the heating device casing 132 has a low thermal conductivity so that the heat produced by the heating device 300 is conducted into the heating material M through the pump cylinder 134 wall. A suitable material for the heating device casing 132 may be 303 stainless steel, 316 stainless steel, and/or non-metallic such as ceramic or plastic.

The heating device 300, when in the form of a flexible wire bundle or cable 302, may be wound about the pump cylinder 134 in any fashion desired to increase the surface area of the exterior surface 134a that is exposed to the heating device 300. For example, as illustrated in FIGS. 5 and 8, the heating device 300 may be wrapped in a serpentine fashion or otherwise, preferably longitudinally and circumferentially about the pump cylinder 134. The extent to which the heating device 300 is provided on the pump cylinder 134, as to size and placement, will be a design choice based on the thermal conductivity of the pump cylinder 134, the heat generating capacity of the heating device 300, and the amount of heat needed so that the pump 26 may intake and output the heated material M. The pump cylinder 134 is preferably made of a high thermally conductive material, for example, stainless steel. In another alternative, multiple wire bundles 302 may be interlaced, for example.

For food materials, it will often be preferred that the heating device 300 not be in direct contact with the heated material M, but in some applications such contact may be acceptable, and for non-food materials it may be acceptable to dispose the heating device 300 so as to be in direct contact with the heated material M within the pump chamber 136. For example, the heating device 300 may be attached to or disposed in a groove that is recessed in the interior surface 134b, or alternatively attached to the interior surface 134b without being recessed.

The heating device cable 302 may include two electrical ends 306a and 306b which may be routed out of the pump interior by way of through holes 307 in the pump head 138 (see FIGS. 8 and 9). These electrical ends 306a and 306b may be connected to an electrical connector 308. The electrical connector 308 may be connected to the control circuit 72 (FIG. 1) so that the control circuit 72 produces an output to the pump heating device 26a to control the amount of heat generated by the heating device 300. For example, the control circuit 72 may adjust the amount of current into the heating device 300 based at least in part on the temperature sensor 62B output signal. Preferably, the electrical connector 308 is positioned in close proximity to the pump 26 so that when the pump 26 is disassembled from the air motor 76 the heating device 300 may also be easily disconnected.

FIGS. 10-12 illustrate an alternative layout arrangement for the heating device 300. In some embodiments, the heating device 300 may be wrapped around the pump cylinder 136 in a helical or spiral manner. The heating device 300 may be but need not be disposed in the groove 304 as in the embodiment of FIGS. 5-9. The electrical ends 306a, 306b of the heating device 300 likewise may be but need not be routed out through the pump head 138 in a similar manner.

For various embodiments of the internally heated pump, the pump cylinder 134 may be warm or hot to the touch. Therefore, an optional cover (not shown) may be used to enclose the pump 26.

With reference next to FIGS. 4, 8 and 9, quick and easy separation of the pump 26 from the air motor 76 is facilitated. The plunger 106 of the pump 26 is coupled to the piston shaft 104 of the air motor with a coupling 108. Preferably, the coupling 108 is of a design that the plunger 106 may be laterally separated from the piston shaft 104 without requiring axial separation. In other words, the coupling 108 provides a zero clearance coupling between the piston shaft 104 and the plunger 106. Note from FIG. 11 that the distal end of the plunger 106 may alternatively have a threaded connection with the coupling 108.

The second shelf 102 that helps support the pump 26 may include a slot 310, for example a U-shaped slot. The slot 310 may be provided with a first flange 312. The pump head 138 may have a U-shape that conforms to the slot 310 and also may include a second flange 314 so that the pump head 138 may easily slide into and out of the slot 310 with a tongue and groove style engagement. Screws 316 may be used to secure the pump head 138 second flange 314 with the first flange 312 of the second shelf 102. After the pump 26 is installed and supported on the second shelf 102, the coupling 108 may be used to connect the piston shaft 104 with the plunger 106. The electrical connector 308 may then be connected to its mating part so that the pump heating device 26a is connected to the control circuit 72.

To remove the pump 26, the electrical connector 308 may be disconnected, the coupling 108 may be disconnected, the screws 316 may be loosened and then the pump 26 may easily be slid out of the slot 310 laterally and separated from the rest of the air motor 76.

Referring again to FIG. 4, an optional housing or cover 318 (shown in phantom) may be used to enclose the actuator section 92 and the drive train section 94. Preferably, the cover 318 extends down to and may be attached to the pump head 138. As such, the upper end of the plunger 106 extends into the housing 318. When the optional cover 318 is used, the cover 318 is removed prior to separation of the pump 26 from the air motor 76.

If there is a leak in the pump 26, the pressurized heated fluid M could escape up into the housing 318. Accordingly, an optional viewing port 320 allows visual inspection of the coupling 108 area inside the housing 318 without first having to remove the housing 318. The viewing port 320 may be realized, for example, using a sight glass or light pipe 322 or other suitable device. In some embodiments, the viewing port 320 and sight glass 322 are incorporated into the pump head 138 in a seal tight manner, however, the viewing port 320 may be provided in multiple viewing ports may be provided as needed.

Figure 15:
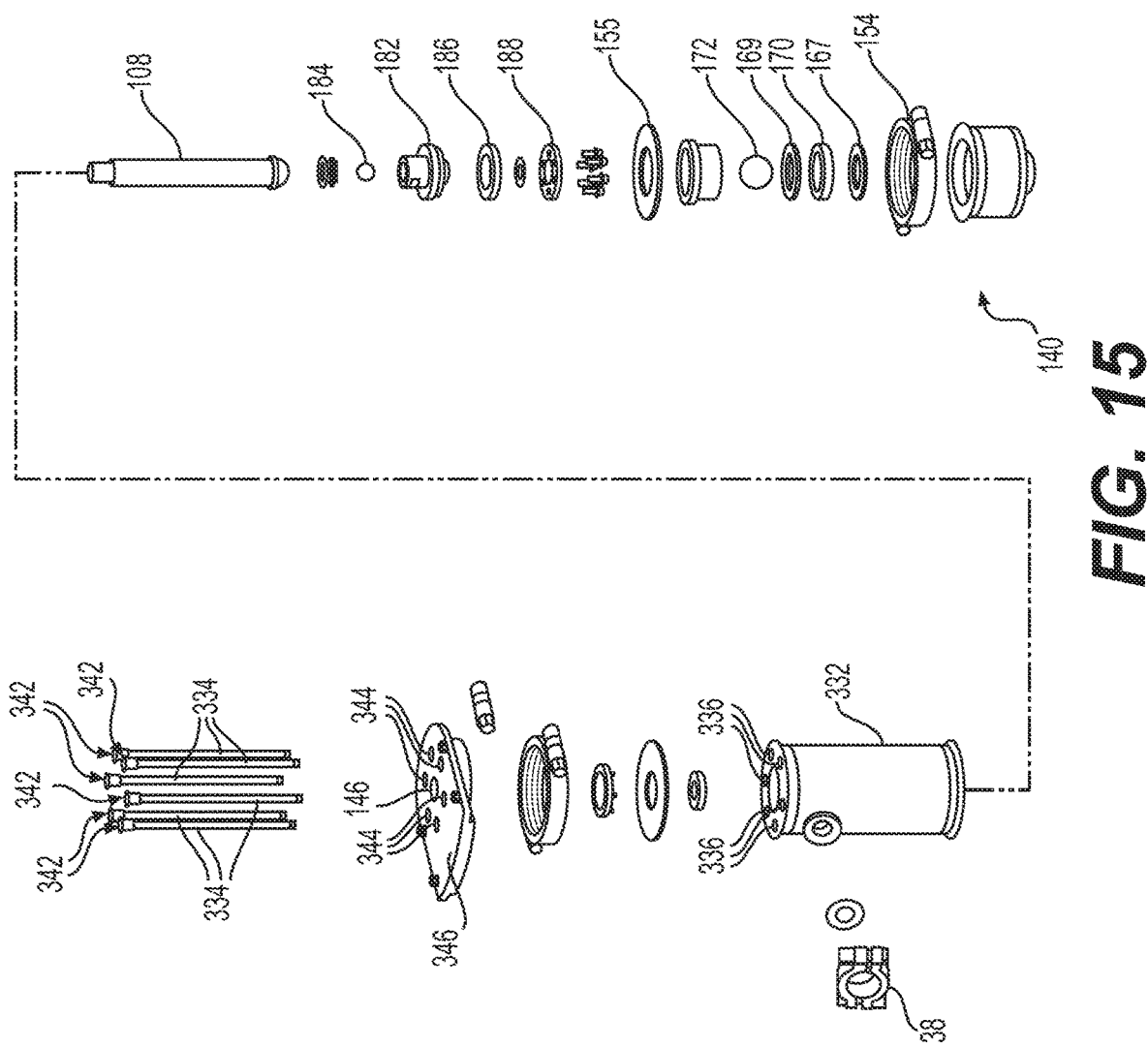

With reference to FIGS. 13-15, in some embodiments, a heating device 26a, one or more heating devices 330 may be distributed about the pump cylinder 332. For example, heating device(s) 330 may include a heating rod 334, such as a cartridge-style heater that may include a wire coil disposed within a rigid case. Each heating rod 334 may be accepted in a blind bore 336 that may be provided in the pump cylinder 332, and that aligns with a through hole 344 in the pump head 346 so that the upper ends of the heating rods 334 extend out of the pump. Each pump head through hole 344 may include a threaded portion 338. Each heating rod 334 may also have a threaded portion 340 that mates with the through hole threaded portion 338. When installed, each heating rod 334 may hang down into the respective blind bore 336 but preferably with a close enough fit to provide good heat exchange with the pump cylinder 332. The upper ends of the heating rods 334 may include electrical contacts 342 for connection to the control circuit 72 via an electrical connector. All other components in the embodiment of FIGS. 13-15 may be but need not be the same as the above described embodiments. Because the heating rods 334 are disposed in the blind bores 336 in the pump cylinder 332, there is no need for a heating device casing 132 disposed about the pump cylinder 332. However, a pump cover (not shown) may be provided as needed.

In another alternative embodiment, a heating device for the pump 26 may be realized in the form of a flat or thin heating ribbon, as contrasted to the heating cable embodiment or the heating rod embodiment.

Filter Assembly

With reference to FIGS. 16-19, the filter F of FIG. 1 may also be provided with an internal heating device. For example, in some embodiments, a filter 350 may include an internal filter heating device 352 with similar design features to the internal heating device 26a of the pump 26. However, different internal heating device designs may be used as needed.

The filter 350 may include a filter body 354 that is connected to a filter head 356 using a suitable clamp 358 such as, for example, a sanitary connection as used with the pump 26. The filter body 354 delimits an internal filter volume V within the filter 350. The filter body 354 and filter head 356 may enclose a filter element 360 that is preferably disposed within the volume V and concentrically within the filter body 354. A fluid inlet 362 admits material, for example, the pressurized heated material M, into the filter 350. The heated material M may pass through the filter element 360 and then pass out of the filter 350 through a filter outlet 364. A spring 366 may be used to help support the filter element 360.

In some embodiments, the internal filter heating device 352 may be a heating device 368 that is attached to the filter body 354 or, for example, a resistive wire bundle or cable that generates heat when electric current passes therethrough. The heating device 368, for example, may be a single continuous wire bundle or may comprises multiple wired bundles or may also be a single conductor. Copper wire is an example of a material that may be used for the heating device.

Figure 18:
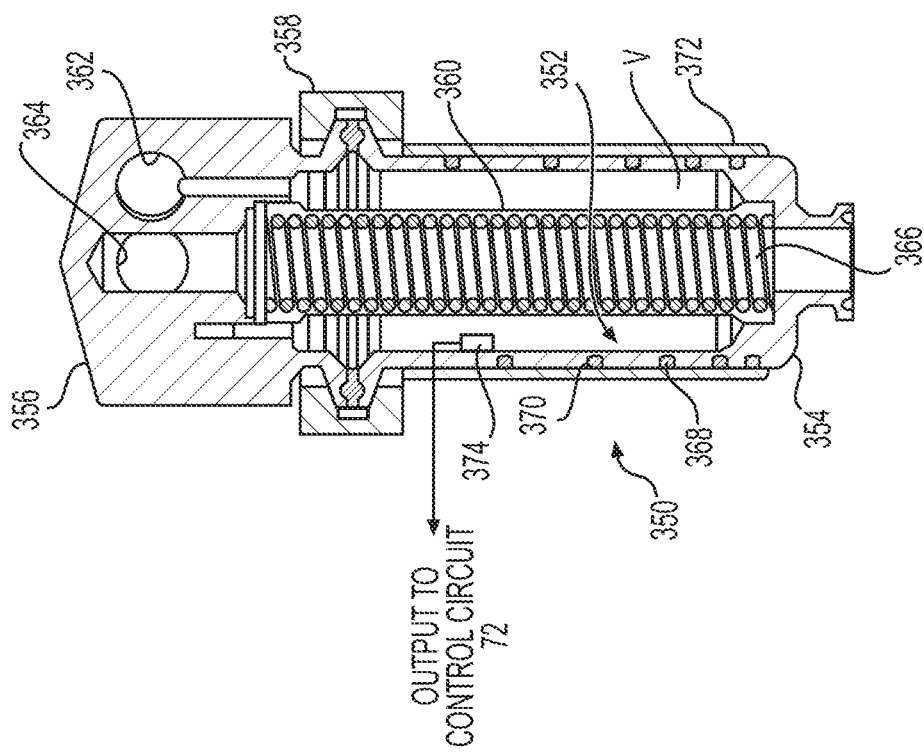
FIG. 18 illustrates an exemplary cross-sectional view taken along the line 18-18 in FIG. 17.
Figure 17:
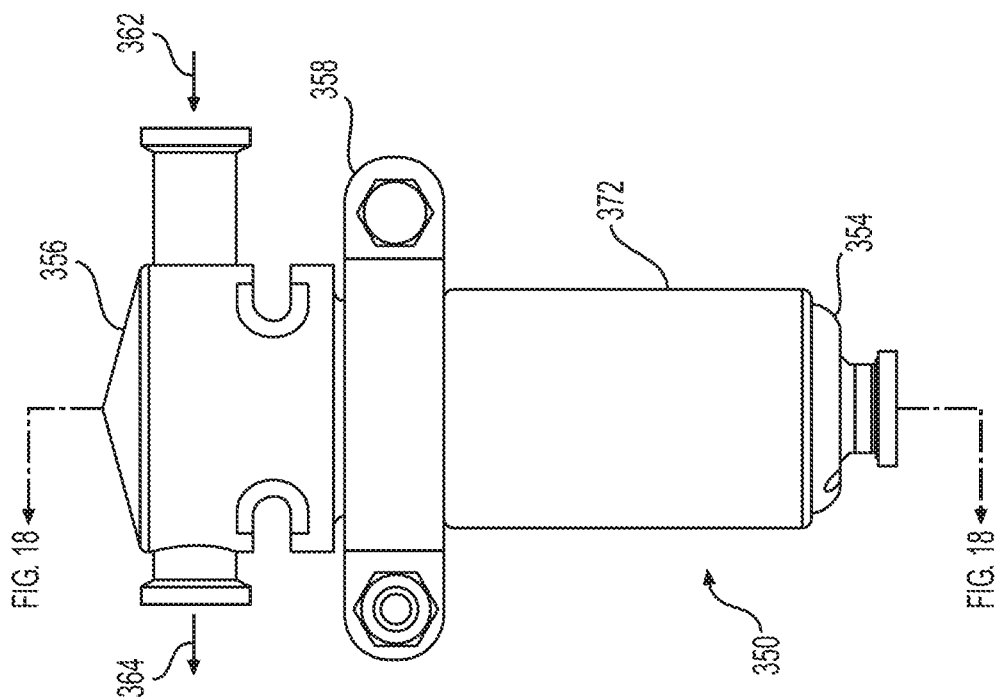
FIG. 17 illustrates an exemplary embodiment of the filter of FIG. 16 in elevation.
Figure 19:
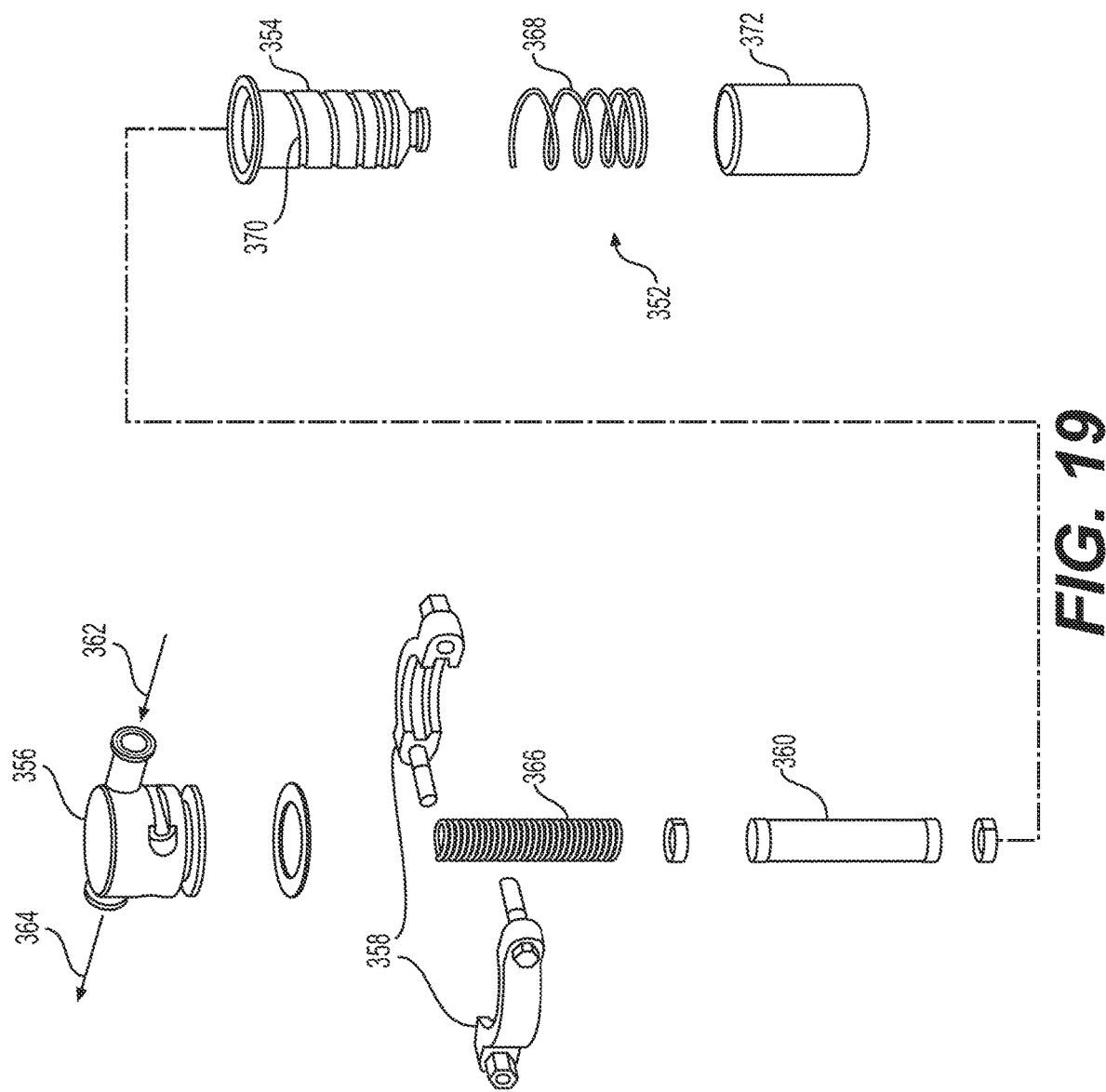
FIG. 19 illustrates an exemplary exploded view of the assembly of FIGS. 16-18.

The heating device 368 may be flexible and attached to the filter body 354 so as to be in intimate thermal heat exchange with the filter body 354, thereby providing heat transfer from the heating device 368 into the interior filter volume V. As illustrated in FIGS. 18 and 19, the heating device 368 may be disposed in a groove or recess 370 that may be formed in an exterior surface 354a of the filter body 354. The heating device 368 may be press fit or swaged into the groove 370 so as to provide intimate and strong contact between the heating device 368 and the filter body 354. By staking the heating device 368 into the groove 370, the heating device 368 may be stable and securely held in place regardless of temperature excursions. By recessing the heating device 368 from the exterior surface 354a, a heating device filter casing 372 may be positioned on the filter body 354 with a smooth appearance and also to minimize gaps between the heating device filter casing 372 and the filter body 354. However, recessing the heating device 368 is not required. Preferably, the heating device filter casing 372 has a low thermal conductivity so that the heat produced by the heating device 368 is conducted into the heating material M through the filter body 354 wall. A suitable material for the heating device filter casing 372 may be 303 stainless steel, 316 stainless steel, and/or non-metallic such as ceramic or plastic.

The heating device 368 may be realized in the form of a flexible wire bundle or cable. In some embodiments, the heating device 368 may be wrapped around the filter body 354 in a helical or spiral manner along the groove 370, such as with a press fit. The electrical ends of the heating device 368 likewise may be but need not be routed out through the filter head 356. The extent to which the heating device 368 is provided on the filter body 354, as to size and placement, may be based on the thermal conductivity of the filter body 354, the heat generating capacity of the heating device 368, and the amount of heat needed so that the heated material M flows through the filter 350. The filter body 354 is preferably made of a high thermally conductive material, for example, stainless steel. As with the pump 26, many different ways may be used to apply the heating device 368 to the filter body 354.

As with the pump 26, the filter heating device 368 may be connected to the control circuit 72, and one or more temperature sensors 374 connected with the control circuit 72 may be used to detect temperature of the heated material inside the filter 350. The control circuit 72 may then produce a heating device control signal to the heating device 368 based on the temperature sensor output signals.

Environment Control System

FIG. 20A, B provide an exemplary embodiment of the environment control system 400 including one or more insulated container(s) 401, 501. In some embodiments, heating may be impractical for all components and conduits of the system 10. Therefore, it may be desirable to enclose unheated components and/or conduits in the one or more insulated container(s) 401, 501 providing an efficient manner to maintain the heated material M at a desired temperature. The environment control system 400 may reduce exposure of the heated material M to room temperature, for example, preventing the heated material M from solidifying. For example, if the pump 26 and/or the conduit heating devices were to turn off or malfunction, the containers 401, 501 may be configured to maintain the enclosed components and/or conduits of the system 10 at an elevated temperature. When the pump 26 and/or conduit heating devices were to regain normal operation, the enclosed heated material M may again circulate without additional recovery efforts to melt the heated material M in the unenclosed portion of the system 10.

Although the insulated container 401 is depicted in FIG. 20A. B, similar elements and reference numbers may be applied to the insulated container 501. For example, the insulated containers 401, 501 may each embody a box including a rigid material 404 lined with one or more layers of insulating material 406. In some embodiments, the rigid material 404 may include a metal (e.g., steel) and the insulating material 406 may include fiberglass, rock wool, and/or cellulose. The container 401 may also include a door 408 configured to provide access to the chamber 402. For example, in some embodiments, the door 408 may be configured to pivot about hinge 409 to open and close. However, in some embodiments, the door 408 may open and close through other mechanisms, such as sliding along a slot in the container 401 (not shown).

The environment control system 400 may define the environment control chamber 402 enclosing one or more components of the system 10. For example, as further depicted in FIG. 20A, B, insulated container 401 may enclose at least a portion of pressure feed conduit 48, the filter 350, and/or the regulator R upstream of the dispenser(s) 44. One or more openings may be provided through a wall of the insulated container(s) 401 to allow access to the components. For example, the container 401 may include one or more openings 410 through the container 401 to provide the flow path FP via conduit 48 in and out of the chamber(s) 402. In some embodiments, in some embodiments, the openings 410 may include a coupling 411 that couples discrete segments of the conduit 48 and allows quick connect/disconnect from the rest of the system 10. However, in some embodiments, a single conduit 48 may extend through the opening 411. Additional openings (not shown) may be provided through insulated container 401, for example, to allow access for power supplies for one or more of the enclosed components and/or accommodate the drain valve D for the filter F. The environment control system 400 may, additionally or alternatively, enclose other components, such as connectors, valves, pressure sensors, and/or flow sensors.

The environment control system 400 may also include a heating device 412, a temperature sensor 414, and/or a fan 416 to control the environment of the chamber 402. The heating device 412 may be configured to receive command signals from the control circuit 72 and generate heat to maintain the temperature of the heated material M, for example, between about 100° F. and 110° F. The insulated container 401 may be configured to heat the material M at an elevated temperature (e.g., 110-180° F.) to increase heat transfer. In some embodiments, the heating device 412 may include a forced convection heater to provide consistent heating in chamber 402. For example, the forced convection heater may be configured to heat chamber 402 through air convection currents across a heater. The temperature sensor 414 may be configured to detect the environmental conditions of the chamber 402 and transmit an indicative signal to control circuit 72. In some embodiments, the temperature sensor 414 may include a thermostat configured to turn the heating device 412 on/off based on the detected temperature. The fan 416 may be configured to increase air circulation of the chamber 402 based on a control signal generated by the control circuit 72. The environment control system 400 may also include other sensors (e.g., a relative humidity sensor) and/or actuators (e.g., a humidifier) configured to control the environment enclosed by the insulated container 401.

Advantageously, the environment control system 400 may efficiently maintain components of the system 10 above a critical minimum temperature, for example, preventing the enclosed heated material M from solidifying under normal conditions, even when pump 26 and/or conduit heating devices are powered off. The environment control system 400 may reduce exposure of the heated material through the loop to components operating at an ambient air temperature. In some embodiments, at least one component (e.g., filter F) enclosed by insulated container 401, 501 may include an internal heating device (e.g., heating device 368). In some embodiments, the internal heating devices of the enclosed components are omitted.

Angular Dispensing System

Figure 21A:
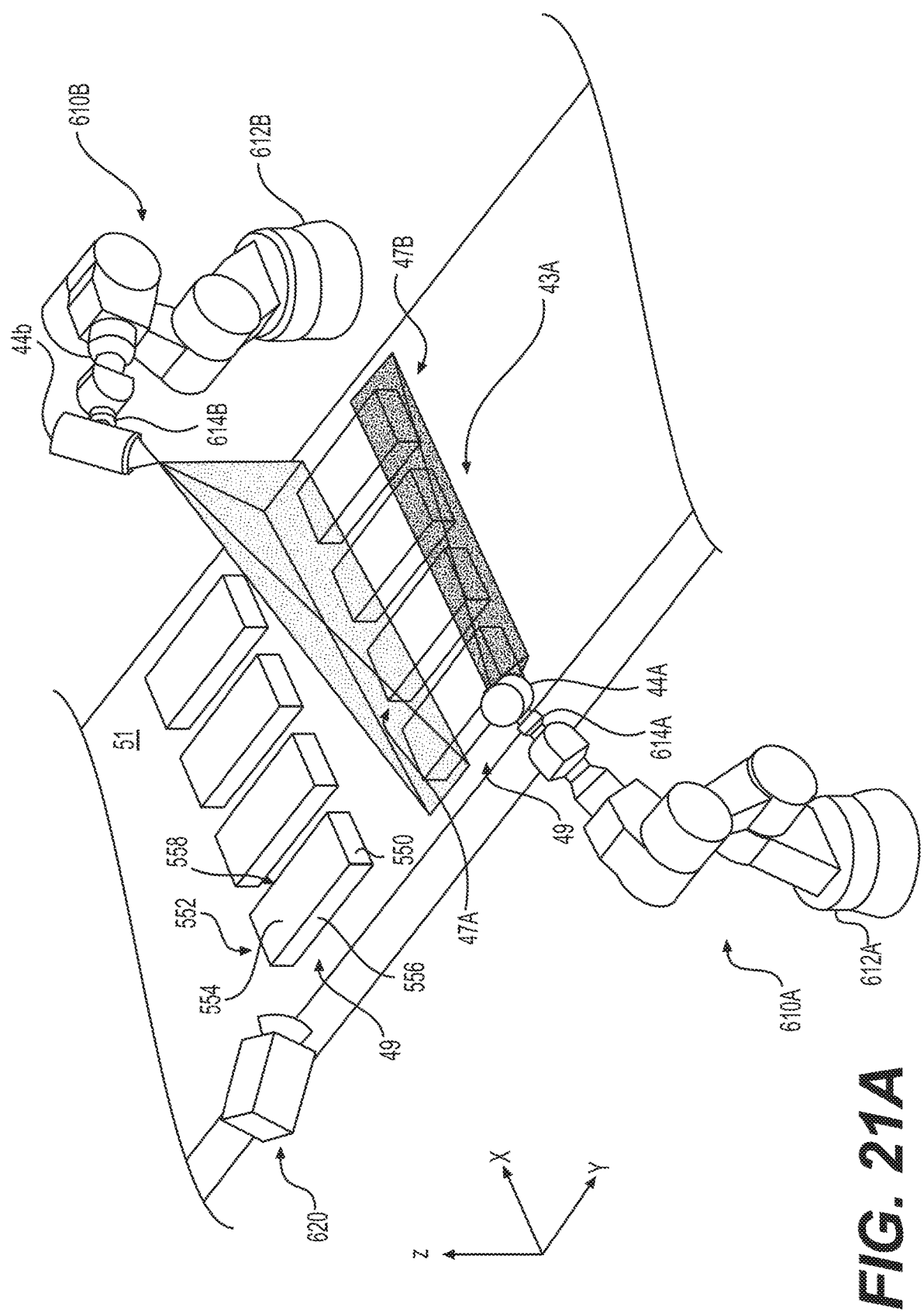
FIG. 21A illustrates an embodiment of an exemplary dispensing system, in isometric view.
Figure 21B:
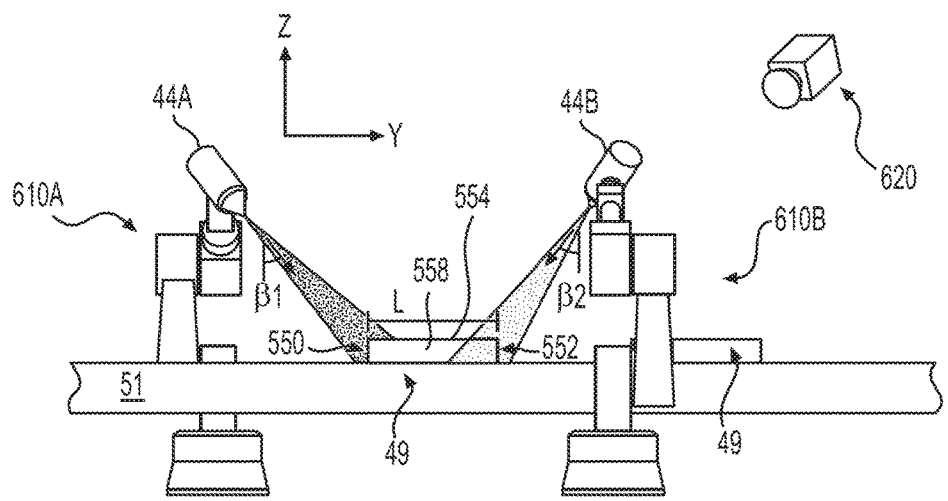
FIG. 21B illustrates an exemplary perspective view of the exemplary dispensing system of FIG. 21A.
Figure 21C:
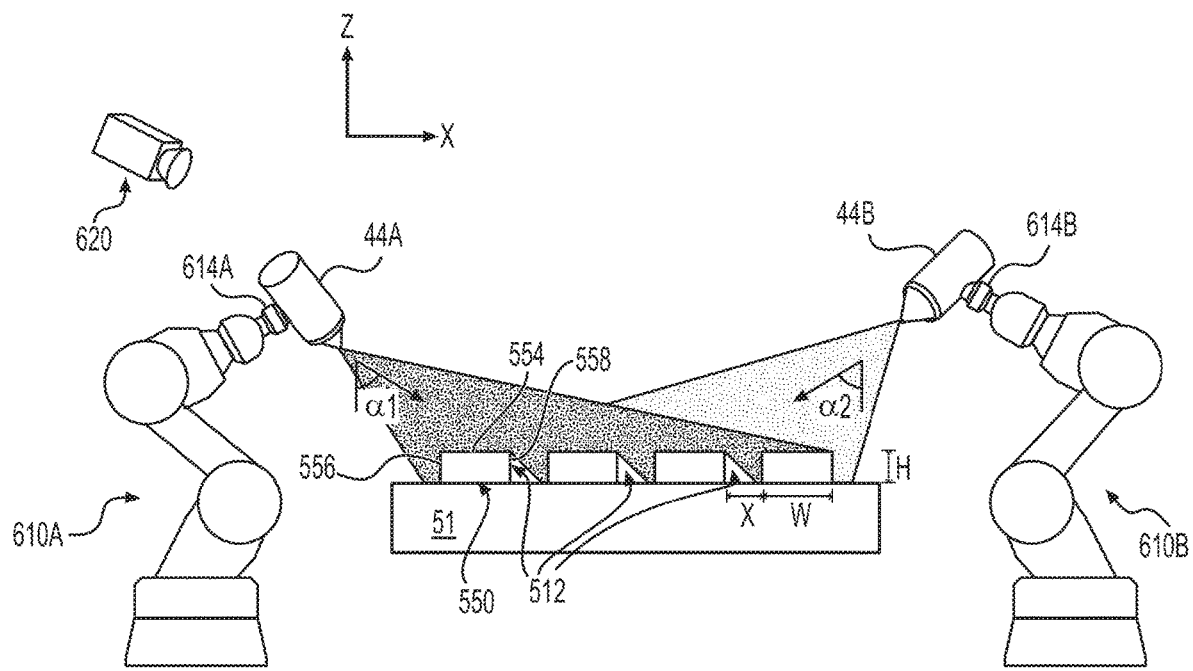
FIG. 21C illustrates another exemplary perspective view of the exemplary dispensing system of FIG. 21A.

FIGS. 21A-C provide an exemplary embodiment of a dispensing system 600 configured to apply heated material M onto surface(s) of one or more substrates 49. As illustrated in FIGS. 21A-C, the substrate(s) 49 may be arranged on the conveyor 51 and advanced along a conveyance axis (Y-axis) running a longitudinal length of the conveyor 51. The conveyor 51 may also define a vertical axis (Z-axis) extending perpendicularly to the surface of the surface of the conveyor 51. The conveyor 51 may further define a lateral axis (X-axis) extending laterally of the longitudinal axis of the conveyor 51. The axes (X, Y, Z) may be mutually perpendicular to define a coordinate system defining an orientation of the one or more dispenser(s) 44, such as a first dispenser 44a configured to apply a first stream 47a and a second dispenser 44b and configured to apply a second stream 47b. The substrate(s) 49 may be arranged in one or more rows to be efficiently coated by the streams 47(a, b).

For example, as depicted in FIG. 21B-C, the first dispenser 44a may define a first lateral angle, $\alpha_1$, in a plane defined by the lateral axis (X-axis) and the vertical axis (Z-axis), and a first vertical angle, $\beta_2$, in a plane defined by the conveyance axis (Y-axis) and the vertical axis (Z-axis). Similarly, the second dispenser 44b may define a second lateral angle, $\alpha_2$, in the X-Z plane, and a second vertical angle, $\beta_2$, in the Y-Z plane. Therefore, each of the dispensers 44 may be oriented in a compound angle ($\alpha$, $\beta$) by having a non-zero angle in each of the X-Z and Y-Z planes. In some embodiments, the first dispenser 44a may be configured to substantially mirror the second dispenser 44b relative to the vertical axis 604, such that the first lateral angle, $\alpha_1$, has a magnitude substantially equal to the second lateral angle, $\alpha_2$, but extending in an opposite direction. Similarly, the first vertical angle, $\beta_1$, may have a magnitude substantially equal the second vertical angle, $\beta_2$, but extending in an opposite direction. The configuration may enable dispensers 44(a, b) to coat multiple surfaces of the substrates 49 simultaneously. For example, the substrates 49 may in the form of a rectangular product having a front surface 550, a rear surface 552, a top surface 554, a first side surface 556, a second side surface 558, and a bottom surface (not shown).

Due to the compound angle ($\alpha$, $\beta$), the first and second dispensers 44(a, b) may be oriented to apply heated material M onto a plurality of surfaces of the substrates 49. For example, the first dispenser 44a may be configured to apply the heated material M onto the front surface 550, the top surface 554, and the first side surface 556. The second dispenser 44b may be configured to apply the heated material M onto the rear surface (not shown), the top surface 554, and the second side surface 558. Accordingly, the dispensers 44(a, b) may apply a single coating of the heated material M to the surfaces 550, 552, 556, 558, and the top surface 554 may be double coated. In some embodiments, the substrate 49 may then be flipped and passed through the streams 47(a, b) a second time to apply a double coating to a bottom surface (not shown), and a second coating to surfaces 550, 552, 556, 558. Therefore, the first and second dispensers 44(a, b) may be oriented to apply two coatings to each of the surfaces. In preferred embodiments, the dispensers 44(a, b) may be oriented in a symmetric orientation with respect to the vertical axis, Z, to provide an even coating on the exposed surfaces of the substrate(s) 49. For example, in some embodiments, the angles ($\alpha$, $\beta$) may be set between about 15 and 60 degrees, and more particularly, about 45 degrees.

The angles ($\alpha$, $\beta$) may be adjusted to affect the coating on each of the surfaces and to accommodate substrates 49 of varying sizes. For example, increasing the first lateral angle, $\alpha_1$, may increase the application of the heated material M onto the front surface 550 of the substrate 49, while reducing the application of heating material M onto the top surface 554 of the substrate 49, and vice versa. Similarly, increasing the first vertical angle, $\beta_1$, may increase the application of the heated material M onto the front surface 502 of the substrate 49, while reducing the application of heated material M onto the top surface 554 of the substrate 49, and vice versa. In another example, smaller vertical angles, a, may be required for substrates with a larger height dimension. Furthermore, depending on the angles (α, β), the streams 47(a, b) may generate a shadow 512 that may be controlled to not overlap adjacent substrates 49 (e.g., preventing a shadow effect). For example, in some embodiments, the angles (α, β) may be automatically controlled based on a variety of inputs, as further discussed, for example, with regard to FIG. 22.

The first and second streams 47(a, b) may be in the form of a flat spray having a lateral dimension substantially larger than a vertical dimension. For example, as depicted in FIGS. 21A, C, the dispensers 44(a, b) may be configured to apply the heated material M onto multiple substrates 49 in a row simultaneously. In a preferred embodiment, the compound angle (α, β) may orient the dispensers 44(a, b) to apply the heated material M without generating the shadow 512 that overlaps with adjacent substrates 49(a, b) (e.g., shadow effect). It is also contemplated that the dispensers 44(a, b) may be positioned, such that the streams 47(a, b) do not overlap each other (as depicted in FIG. 21B) in order to optimize the application of the heated material M.

Each dispenser 44(a, b) may be supported and reoriented by an arm 61 (a, b) actuated by a motor 612(a, b). For example, the arms 610(a, b) may include one or more articulating segments configured to adjust one or more of the angles (α, β) of the dispensers 44(a, b). The arms 610(a, b) may include a first and second segments configured to rotate in one or more planes. The dispensers 44(a, b) may also be adjusted through a swivel connection 614(a, b) that enables lateral rotation and pivoting relative to the segments of the arms 610(a, b). The dispensers 44(a, b), the arms 610(a, b), and/or the swivel connection 614(a, b) may be actuated by the motors 612(a, b) based on a control signal from the control circuit 72, as further discussed with regard to FIG. 22.

In some embodiments, the system 10 may include one or more sensors to detect the position and/or dimensions of the substrate(s) 49 and generate a signal. For example, one or more optical registration devices (e.g., cameras 620) may be configured to capture an image of the substrates 49 on the conveyor 51 and transmit the image to the control circuit 72. Other optical registration devices may be included, such as ultrasonic, radar, and/or laser detection sensors.

The sensors may include weight sensors (e.g., capacitive displacement sensors) in the conveyor 51 to detect the positioning of the substrates 49. The control circuit 72 may be configured to process the signal (e.g., the image) with software to extract data from the manufacturing process. For example, the control circuit 72 may be configured to extract dimensions of the substrates 49, such as a height H, a width W, and/or a length L, as depicted in FIGS. 21B-C. The control circuit 72 may also determine the distance X between adjacent substrates 49. In order to correlate the detected substrates 49 to the stream 47, the control circuit 72 may be further configured to count steps to predetermined distances and/or determine a time delay between the detected position on the conveyor 51 and the location of the stream 47. The predetermined distances and/or time delay may enable the system 10 to adjust dispensers 44 based on the position of the substrate 49. For example, the dispensers 44 may only turn on when the substrates 49 are in an application positioning. It may also enable system 10 to adjust to substrates 49 of different sizes and/or arrangements.

Figure 22:
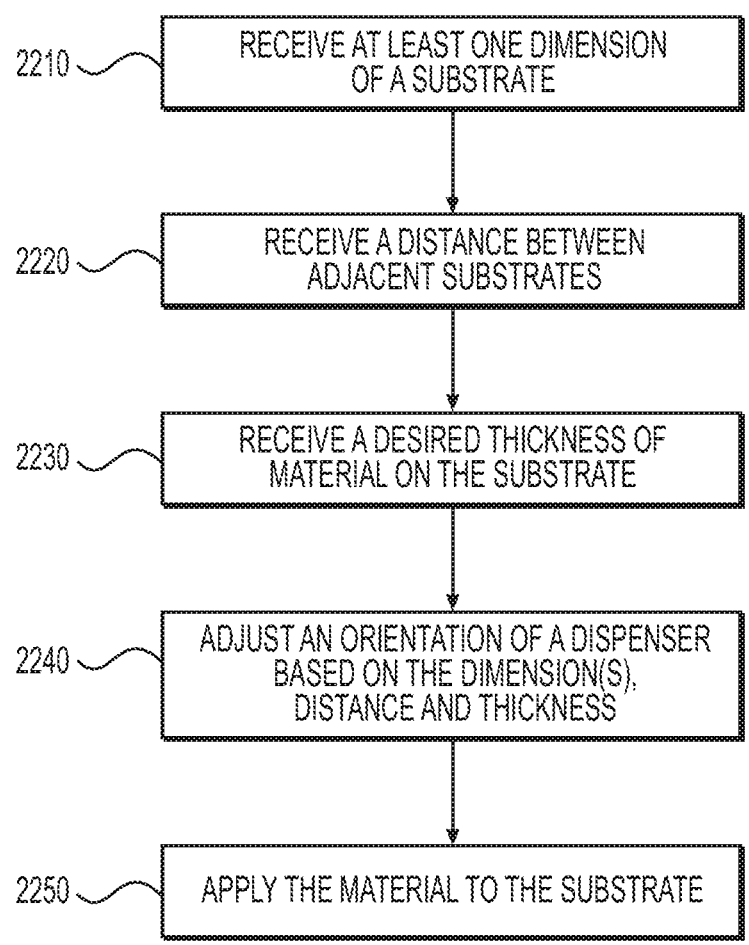
FIG. 22 illustrates an exemplary method of controlling an application of a material onto a surface.

FIG. 22 illustrates a flow chart depicting exemplary steps of a method 2200 of dispensing heated material (e.g., M) onto at least one substrate (e.g., 49) positioned on a surface (e.g., the conveyor 51). For example, the dispenser(s) 44 may be adjustably oriented at a compound angle (α, β) with respect to the conveyor 51 to coat one or more surfaces of the substrate(s) 49. The angle may be adjusted based on a number of factors to optimize a desired coating without producing a shadow effect on adjacent substrates 49.

In step 2210, the system 10 may receive at least one dimension of the substrate(s). The dimensions of the substrate(s) 49 may include at least one of the height H, the width W, and the length L, and may be received through a number of different operations. For example, the dimensions of the substrate(s) 49 may be received through detection of a number different types of sensors, such as the camera 620. The camera 620 may capture an image of the substrate(s) 49 on the conveyor 51, which may be processed by the control circuit 72. The control circuit 72 may extract the height H, width W, and/or length L of each of the substrate(s) 49 to be stored in date storage of the control circuit 72.

The dimensions may, additionally or alternatively, be received from third party servers and/or user input at user interface 200. For instance, a central server may send the dimensions of the substrates 49 to the control circuit 72. The dimensions of the substrate(s) 49 may be considered in the angle of the dispenser(s) 44 to provide a proper coating of the heated material M, but may also be considered in preventing a shadow effect on adjacent substrates 49. The length of the dispense on cycle may be determined by a signal from the sensors. The control circuit 72 may count steps to predetermined distances and/or determine a time delay between the detected position on the conveyor 51 and the location of the stream 47. The predetermined distances and/or time delay may enable the system 10 to adjust dispensers 44 based on the position of the substrate 49. For example, the dispensers 44 may only turn on when the substrates 49 are in an application positioning. It may also enable system 10 to adjust to substrates 49 of different sizes and/or arrangements.

In step 2220, the system may receive the distance X between the substrates 49. For example, the distance X between the substrates may be received in one or more of the operations as discussed with regard to step 2210. For instance, in some embodiments, the control circuit 72 may extract the distances X between the substrates 49 based on processing images captured by the camera 620. The distance between the substrates 49 may be considered in preventing a shadow effect on adjacent substrates 49.

In step 2230, the system 10 may receive a desired thickness of the heated material M on the substrate. For example, the control circuit 72 may receive a desired thickness of each of the surfaces. The desired thickness may be received from the central servers and/or user input at user interface 200, as discussed with regard to steps 2210, 2220. The desired thickness of the heated material M on the surfaces of the substrate may considered in determining the angle of the dispensers 44.

In step 2240, the system 10 may adjust the orientation of the dispenser(s) 44 based on the dimension, the distance X, and the desired thickness. For example, the control circuit 72 may determine optimal angles α, β for each of the dispensers 44 based on the data received in steps 2210-2230. For instance, the control circuit 72 may determine the required lateral angle, α, for each of the dispensers 43 to dispense the heated material M onto the substrate(s) without creating a shadow effect. Substrates 49 with a greater height may create larger shadows 512 based on the lateral angle, α, of the dispensers 44. The vertical angles, β, may also be adjusted based on the dimensions and/or the desired thickness on each of the surfaces. The control circuit 72 may then generate and transmit a control signal to the motors 612(a, b) of the arms 610(a, b) to orient the dispensers 44(a, b) at the desired angles, α, β.

In step 2240, the dispensers 44(a, b) may apply the heated material M to the substrate at the adjusted angles α, β.

Control System for Application Pressure

Figure 23:
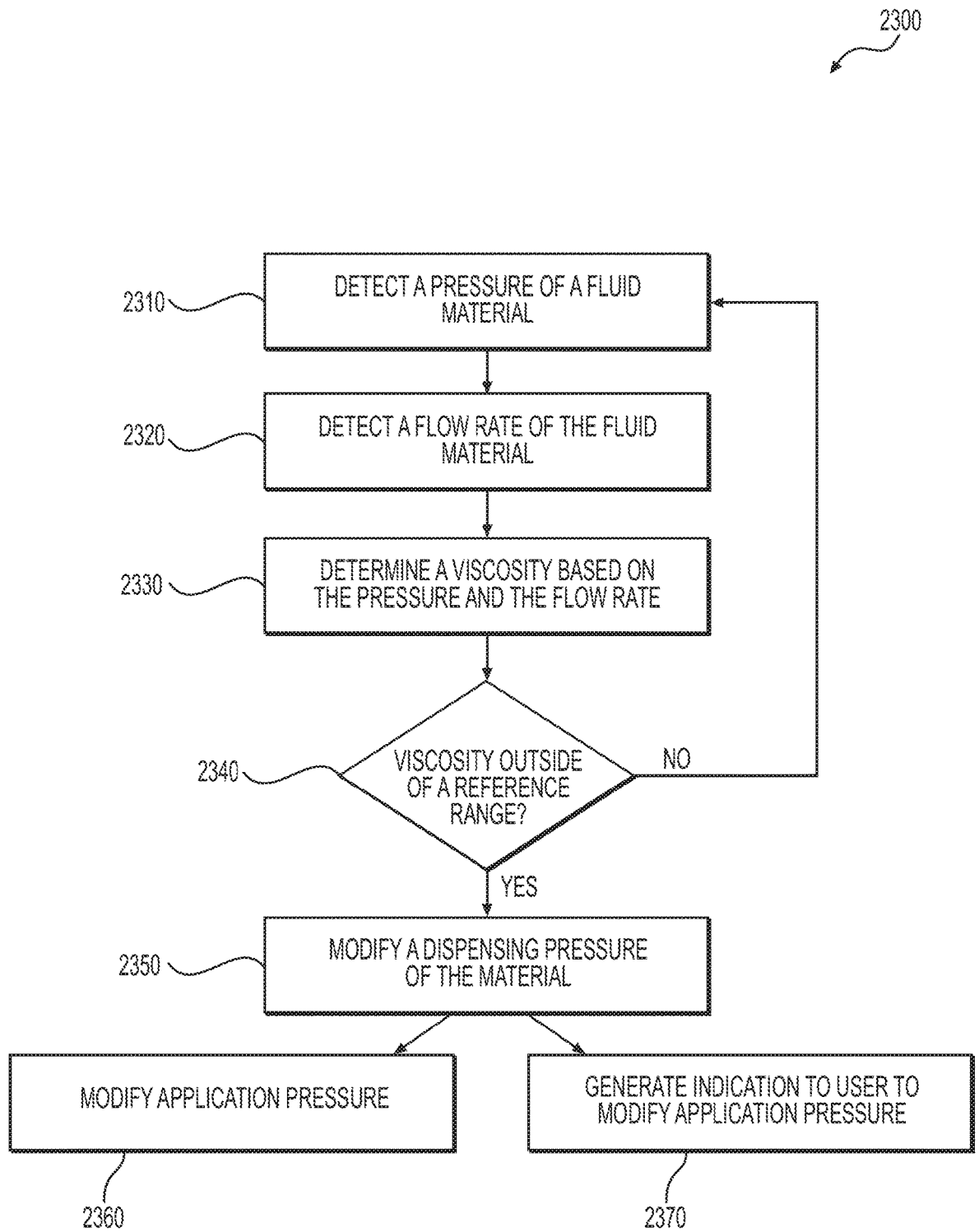
FIG. 23 illustrates an exemplary method of controlling an application pressure of a material onto a surface.

FIG. 23 illustrates a flow chart depicting exemplary steps of a method 2300 of adjusting the application of a fluid material (e.g., heated material M) to a substrate (e.g., 49). The method 2300 may be performed by one or more components of system 10 to optimize the spray pattern of the dispensers 44 based on the determination of the viscosity of the heated material M. For example, in some embodiments, the viscosity may be determined by the control circuit 72 based on the detection of the pressure of the heated material M and the flow rate of the heated material M in the conduit. The system may then adjust the application of the heated material M, for example, by adjusting the pressure of the fluid material in the system 10 and/or indicating to a user to introduce additional heated material M into the system 10.

In step 2310, the system 10 may detect a pressure of the heated material M in a conduit. For example, one or more of pressure sensors 70(A-C) may detect the pressure of the heated material M in one or more of the conduits (e.g., 32, 48, 52) and generate a signal to control circuit 72 where the data may be stored. In some embodiments, the system 10 may continually detect the pressure to monitor the material state of the heated material M.

In step 2320, the system 10 may detect a flow rate of the heated material M in the conduit. For example, one or more of flow sensors 69(A-C) may detect the flow rate of the heated material M in one or more of the conduits (e.g., 32, 48, 52) and generate a signal to control circuit 72 where the data may be stored. The system 10 may continually detect the pressure to monitor the material state of the heated material M.

In step 2330, the system 10 may determine the viscosity of the heated material M based on the detected pressure(s) and flow rate(s). The control circuit 72 may determine the viscosity of the heated material M based on Poiseuille's equation and the detected local pressure(s) and flow rate(s). For example, data from each flow sensor 69a may be correlated with data from local pressure sensors 70a, to determine the viscosity of the heated material M proximate thereof. In some embodiments, the control circuit 72 may determine the viscosity of the heated material M based on averaging the local viscosity at a plurality of locations in system 10.

In step 2340, the system 10 may compare the determined viscosity to a reference value. The reference value may be accessed from a look-up table stored in the control circuit 72 that may correlate determined viscosities to desired spray settings of the system 10. The control circuit 72 may determine if the determined viscosity is below a lower reference value of a range, or if the determined viscosity if above a higher reference value of the range. The range may correlate a viscosity value to a desired application of the heater material M. If determined that the viscosity is inside of the reference range (NO, step 2340), control circuit 72 may return to step 2310. However, if determined that the viscosity of the heated material M is outside of a desired range (YES, step 2340), the spray area and/or droplet size of the stream 47 may be adversely affected. Therefore, control circuit 72 may generate a signal to perform one of more steps to adjust the viscosity of the heated material M.

In step 2350, the control circuit 72 may adjust the application pressure of the heated material M based on the signal generated in step 2340. For instance, the control circuit 72 may generate a signal to the pump 26 to increase the fluid pressure of the heated material M based on a determination that the viscosity is too low, and vice versa. Additionally or alternatively, the control circuit 72 may decrease the opening of the nozzle of the dispenser 44 based on the viscosity being too low, and vice versa. The system 10 may automatically adjust the amount of heated material M in the system 10 by transmitting signals to actuators of the system 10. For example, the control circuit 72 may be configured to automatically adjust the drain valve 56 to remove heated material M from the system 10. The control circuit 72 may actuate the step motors on the regulators R to adjust (e.g., turn up or down) the regulators R. The control circuit 72 may, additionally or alternatively, introduce additional material M to one or more supply 12.

In step 2360, the system 10 may, additionally or alternatively, output an indication to a user to adjust the material properties of the heated material M. For example, control circuit 72 may transmit a signal to the user interface 200 to display an output to the user to adjust the amount of heated material M in system 10. For example, the output may direct the user to "ADD MORE FLUID MATERIAL" or "ACTUATE DRAIN VALVE TO REMOVE FLUID MATERIAL." Similarly, the output may direct the user to adjust the settings of the pump 26 and/or the dispenser(s) 44.

Control System for Temperature Fall-Back

Figure 24:
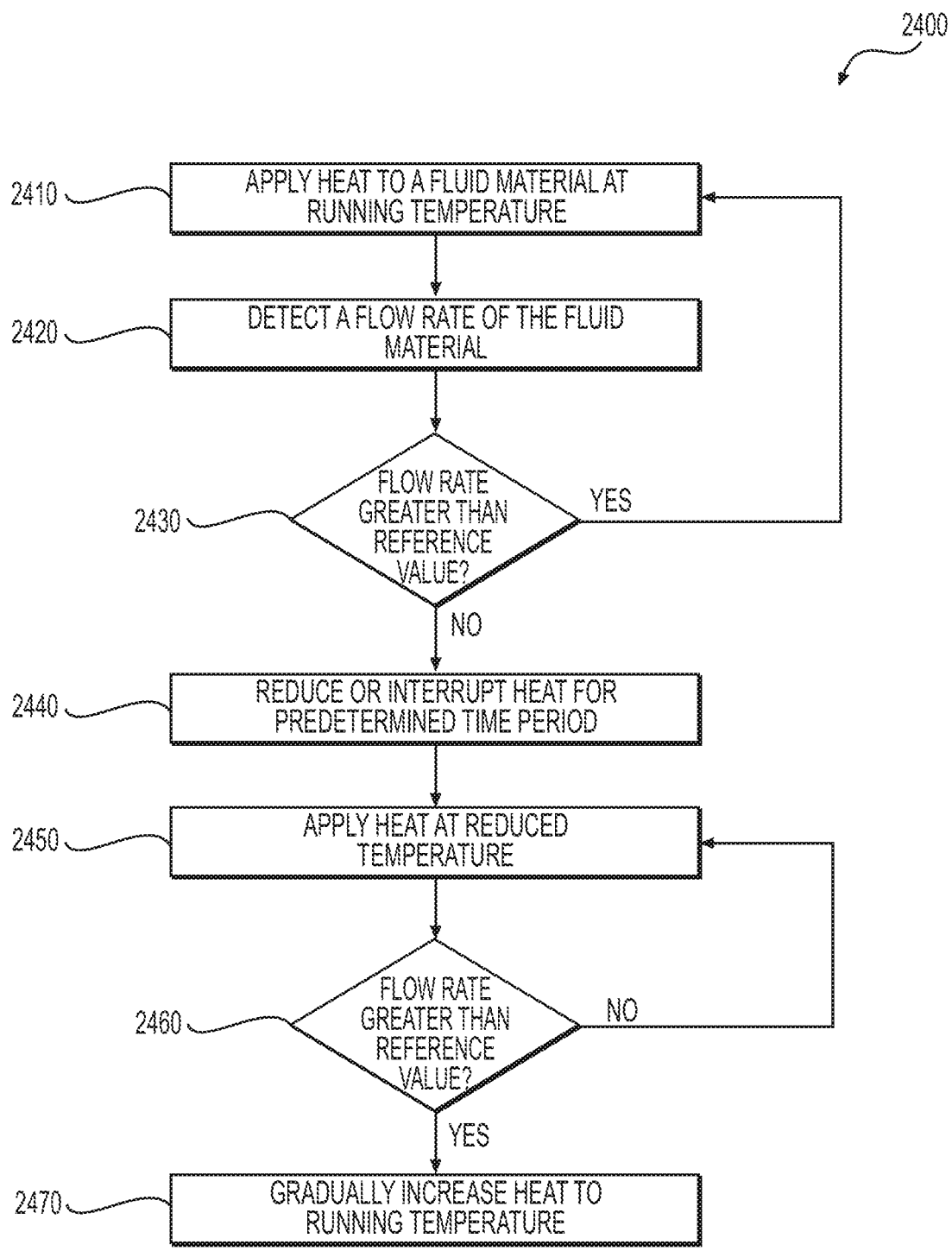
FIG. 24 illustrates an exemplary method of preventing the overheating of the material.

FIG. 24 illustrates a flow chart depicting exemplary steps of a method 2400 of preventing the overheating of heated material M. One or more temperature zones of the system 10 may be raised above the desired temperature in order to transfer sufficient heat to the heated material M as it is circulated. For example, the heated material M may be propelled rapidly in one or more of the temperature zones requiring additional heat to be applied for sufficient heat transfer. For example, the heated material M may have a desired temperature of about 110-115° F., but in one or more of the temperature zones, the heaters may apply heat at a running temperature range of about 125-180° F. to increase heat transfer. However, if the flow rate of the heated material M is reduced (e.g., if a conduit became temporarily blocked), the heated material M may become overheated and charred in those temperature zones. Accordingly, the control system may perform method 2400 to provide favorable heating conditions. Therefore, the system 10 may accommodate a wide variety of flow rates without expensive accumulators because the individual zones may be set to provide sufficient heat to the heated material M, without the risk of over-heating if the flow were to slow or stop.

In step 2410, system 10 may apply heat to a fluid material (e.g., heated material M) at a running setting. The running setting may apply heat to the heated material M at a level optimal for the application of dispenser(s) 44. In some embodiments, one or more of the heaters may apply varying levels of heat to create temperature zones in system 10. For example, the feed conduit heating device 50 may be configured to apply an elevated temperature (e.g., about 125-180° F.) to the heated material M above the desired set point because of the flow conditions downstream of the pump 26.

In step 2420, the system 10 may detect a flow rate of the heated material. For example, the pressure sensors 70(A-C) may continually monitor the temperature of the heated material M throughout the system and transmit indicative signals to the control circuit 72, similar to step 2230.

In step 2430, the system 10 may compare the flow rate of the heated material to a reference value. For example, if the control circuit 72 determines that each of the detected flow rates are at or above the reference value for each temperature zone (YES, step 2430), the control circuit 72 may return to step 2410 to continue applying the running settings. However, control circuit 72 may determine that one or more of the detected flow rates are below the reference value (NO, step 2430). For example, control circuit 72 may detect a blockage of the heated material M in a conduit (e.g., feed conduit 48) by determining that the flow rate detected by flow sensor 69c is less than a reference value assigned to flow sensor 69c, and system 10 may then proceed to step 2440.

In step 2440, the system 10 may reduce or interrupt heat for a predetermined time period. For example, if a reduced flow rate is detected in a conduit, the control circuit 72 may generate a signal to one or more heaters to reduce or interrupt the heat applied to the heated material M. The control circuit 72 may reduce or interrupt heat applied by the heaters throughout the system. In some embodiments, the control circuit 72 may reduce or interrupt heat applied locally to the reduce flow rate and/or at the temperature zones elevated above the desired temperature. Step 2440 may reduce the temperature of the heated material M to a temperature that does not burn or char the heated material M.

In step 2450, the system 10 may apply heat to the heated material M at a reduced setting. The reduced settings may include heating the heated material M at a reduced temperature (e.g., 105-110° F.) compared to the running temperatures. The reduced settings may be above a critical temperature for the heated material M to remain in a fluid state, but will not burn or char the heated material. For example, the system 10 may power off the heat (step 2440), then power on the heat to the reduced setting (step 2450) to gradually increase the temperature of the heated material M.

In step 2460, the system 10 may determine if the flow rate is greater than the reference value. For example, the control circuit 72 may determine whether the blockage of the system 10 is removed and/or the flow of the heated material M is at a level suitable for applying elevated temperatures. In some embodiments, the reference value of step 2460 may be the same reference value of step 2430. If the control circuit 72 determines that the flow rate is not greater than the reference value (NO, step 2460), the system 10 may continue to apply heat at reduced temperature (step 2450). However, if the control circuit 72 determines that the flow rate is greater than the reference value (YES, step 2460), the system 10 may proceed to step 2470.

In step 2470, the system 10 may gradually increase the applied heat until the running temperatures are obtained. For example, the system 10 may elevate the heat applied by the heaters in a step-wise function, such as at a rate of about 5° F. per minute.

The disclosure has been described with reference to exemplary embodiments. Modifications and alterations will occur to others upon a reading and understanding of this specification and drawings. The disclosure is intended to include all such modifications and alterations insofar as they come within the scope of the appended claims or the equivalents thereof.

What is claimed is:

1. A system for circulating a material in a flow circuit, and for periodically dispensing at least a portion of the material from the system onto a substrate, the system comprising:
   a dispenser configured to apply the material onto a surface of the substrate; and
   a control system for adjusting the dispensing of the material onto the substrate, the control system comprising:
   a pressure sensor configured to detect a pressure of a flow of the material through the flow circuit;
   a flow sensor configured to detect a flow rate of the flow of the material through the flow circuit; and
   a control circuit in communication with the pressure sensor and the flow sensor, the control circuit configured to:
   determine a viscosity of the material based on the detected pressure and the detected flow rate;
   compare the determined viscosity to a reference value; and
   generate a signal to modify a dispensing pressure of the material in the dispenser based on the comparison, such that the pressure sensor detects a change of the pressure of the flow of the material through the flow circuit,
   wherein the control circuit is configured to increase the dispensing pressure when the determined viscosity is less than the reference value, and is configured to decrease the dispensing pressure when the determined viscosity is greater than the reference value.

2. The system of claim 1, wherein the control circuit is configured to modify the dispensing pressure by adjusting a pressure of a pump based on the signal.

3. The system of claim 1, wherein the control circuit is configured to direct the signal to a display to indicate to a user to modify an amount of the material in the system for circulating the material in the flow circuit.

4. The system of claim 1, wherein the material includes at least one of chocolate, oil, icing, and butter.

5. The system of claim 1, wherein the pressure sensor is located proximally of the flow sensor.

6. The system of claim 1, wherein comparing the determined viscosity includes determining if the viscosity is below a first reference value of a range or above a second reference value of the range.

7. The system of claim 1, wherein the control circuit is configured to generate a signal to modify an application pressure of the material based on the comparison such that the viscosity of the material being periodically applied to the substrate is modified.

8. The system of claim 1, wherein the reference value is a range of viscosity values, the range being defined by a first reference value and a second reference value different from the first reference value.

9. The system of claim 1, wherein the control system is configured to actuate the size of an outlet opening of the dispenser through which the material is periodically applied, the control system being configured to decrease the size of the outlet opening when the determined viscosity is less than the reference value, and being configured to increase the size of the outlet opening when the determined viscosity is greater than the reference value.

10. The system of claim 1, wherein the material within the system for circulating the material in the flow circuit has a temperature, and wherein the control system is configured to decrease the temperature of the material when the detected flow rate is less than a flow-rate reference value and to increase the temperature of the material when the detected flow rate is greater than the flow-rate reference value.

11. The system of claim 1, wherein the control system is configured to introduce more of the material into the system for circulating the material in the flow circuit or remove a portion of the material from the system for circulating the material in the flow circuit based on the determined viscosity.

12. The system of claim 11, wherein the control system is configured to move the portion of the material into a re-circulation channel.

13. The system of claim 1, wherein the control circuit is configured to generate a signal to modify the dispensing pressure of the material as the material is being applied from the dispenser.

14. The system of claim 1, wherein the pressure sensor is disposed entirely upstream of the dispenser such that the flow of material through the flow circuit reaches the pressure sensor before reaching the dispenser.

* * * * *